United States Patent
Wang et al.

(10) Patent No.: US 10,768,747 B2
(45) Date of Patent: Sep. 8, 2020

(54) HAPTIC REALIGNMENT CUES FOR TOUCH-INPUT DISPLAYS

(71) Applicant: Apple Inc., Cupertino, CA (US)

(72) Inventors: Paul X. Wang, Cupertino, CA (US); Ian M. Bullock, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/041,659

(22) Filed: Jul. 20, 2018

(65) Prior Publication Data

US 2019/0064997 A1 Feb. 28, 2019

Related U.S. Application Data

(60) Provisional application No. 62/553,041, filed on Aug. 31, 2017.

(51) Int. Cl.
| | | |
|---|---|---|
| G06F 3/041 | (2006.01) | |
| G06F 3/0481 | (2013.01) | |
| G06F 3/0488 | (2013.01) | |
| G06F 3/01 | (2006.01) | |

(52) U.S. Cl.
CPC ............ *G06F 3/0418* (2013.01); *G06F 3/016* (2013.01); *G06F 3/0488* (2013.01); *G06F 3/04812* (2013.01); *G06F 3/04886* (2013.01); *G06F 2203/014* (2013.01)

(58) Field of Classification Search
CPC .... G06F 3/016; G06F 3/0418; G06F 3/04182; G06F 3/0488; G06F 3/04886; G06F 2203/014
See application file for complete search history.

(56) References Cited

U.S. PATENT DOCUMENTS

| | | |
|---|---|---|
| 5,196,745 A | 3/1993 | Trumper et al. |
| 5,293,161 A | 3/1994 | MacDonald et al. |
| 5,424,756 A | 6/1995 | Ho et al. |
| 5,434,549 A | 7/1995 | Hirabayashi et al. |
| 5,436,622 A | 7/1995 | Gutman et al. |
| 5,668,423 A | 9/1997 | You et al. |
| 5,842,967 A | 1/1998 | Kroll |
| 5,739,759 A | 4/1998 | Nakazawa et al. |
| 6,084,319 A | 7/2000 | Kamata et al. |
| 6,342,880 B2 | 1/2002 | Rosenberg et al. |

(Continued)

FOREIGN PATENT DOCUMENTS

| | | |
|---|---|---|
| CN | 101036105 | 9/2007 |
| CN | 201044066 | 4/2008 |

(Continued)

OTHER PUBLICATIONS

Author Unknown, "3D Printed Mini Haptic Actuator," Autodesk, Inc., 16 pages, 2016.

(Continued)

*Primary Examiner* — David Tung
(74) *Attorney, Agent, or Firm* — Brownstein Hyatt Farber Schreck, LLP

(57) ABSTRACT

A touch-sensitive display of an electronic device is operated in conjunction with a notification system configured to provide haptic, acoustic, and/or visual output to cue a user to align and/or maintain the user's finger positioning relative to one or more virtual input regions, such as virtual keys of a virtual keyboard, presented on the touch-sensitive display.

20 Claims, 16 Drawing Sheets

(56) References Cited

U.S. PATENT DOCUMENTS

| | | |
|---|---|---|
| 6,373,465 B2 | 4/2002 | Jolly et al. |
| 6,388,789 B1 | 5/2002 | Bernstein |
| 6,438,393 B1 | 8/2002 | Surronen |
| 6,445,093 B1 | 9/2002 | Binnard |
| 6,493,612 B1 | 12/2002 | Bisset et al. |
| 6,554,191 B2 | 4/2003 | Yoneya |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,126,254 B2 | 10/2006 | Nanataki et al. |
| 7,130,664 B1 | 10/2006 | Williams |
| 7,196,688 B2 | 3/2007 | Shena et al. |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,321,180 B2 | 1/2008 | Takeuchi et al. |
| 7,323,959 B2 | 1/2008 | Naka et al. |
| 7,336,006 B2 | 2/2008 | Watanabe et al. |
| 7,339,572 B2 | 3/2008 | Schena |
| 7,355,305 B2 | 4/2008 | Nakamura et al. |
| 7,360,446 B2 | 4/2008 | Dai et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,576,477 B2 | 8/2009 | Koizumi |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,020,266 B2 | 9/2011 | Ulm et al. |
| 8,040,224 B2 | 10/2011 | Hwang |
| 8,053,688 B2 | 11/2011 | Conzola et al. |
| 8,063,892 B2 | 11/2011 | Shahoian |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,169,402 B2 | 6/2012 | Shahoian et al. |
| 8,217,892 B2 | 7/2012 | Meadors |
| 8,217,910 B2 | 7/2012 | Stallings et al. |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,264,465 B2 | 9/2012 | Grant et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,421,609 B2 | 4/2013 | Kim et al. |
| 8,432,365 B2 | 4/2013 | Kim et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,604,670 B2 | 12/2013 | Mahameed et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,628,173 B2 | 1/2014 | Stephens et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,653,785 B2 | 2/2014 | Collopy |
| 8,654,524 B2 | 2/2014 | Pance et al. |
| 8,681,130 B2 | 3/2014 | Adhikari |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,780,074 B2 | 7/2014 | Castillo et al. |
| 8,797,153 B2 | 8/2014 | Vanhelle et al. |
| 8,797,295 B2 | 8/2014 | Bernstein |
| 8,803,670 B2 | 8/2014 | Steckel et al. |
| 8,834,390 B2 | 9/2014 | Couvillon |
| 8,836,502 B2 | 9/2014 | Culbert et al. |
| 8,836,643 B2 | 9/2014 | Romera Joliff et al. |
| 8,867,757 B1 | 10/2014 | Ooi |
| 8,872,448 B2 | 10/2014 | Boldyrev et al. |
| 8,878,401 B2 | 11/2014 | Lee |
| 8,890,824 B2 | 11/2014 | Guard |
| 8,907,661 B2 | 12/2014 | Maier et al. |
| 8,976,139 B2 | 3/2015 | Koga et al. |
| 8,976,141 B2 | 3/2015 | Myers et al. |
| 8,977,376 B1 | 3/2015 | Lin et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,046,947 B2 | 6/2015 | Takeda |
| 9,049,339 B2 | 6/2015 | Muench |
| 9,052,785 B2 | 6/2015 | Horie |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,104,285 B2 | 8/2015 | Colgate et al. |
| 9,116,570 B2 | 8/2015 | Lee et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,182,837 B2 | 11/2015 | Day |
| 9,218,727 B2 | 12/2015 | Rothkopf et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,319,150 B2 | 4/2016 | Peeler et al. |
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |

(56) References Cited

U.S. PATENT DOCUMENTS

| | | | |
|---|---|---|---|
| 9,442,570 B2 | 9/2016 | Slonneger | |
| 9,448,713 B2 | 9/2016 | Cruz-Hernandez et al. | |
| 9,449,476 B2 | 9/2016 | Lynn et al. | |
| 9,459,734 B2 | 10/2016 | Day | |
| 9,466,783 B2 | 10/2016 | Olien et al. | |
| 9,489,049 B2 | 11/2016 | Li | |
| 9,496,777 B2 | 11/2016 | Jung | |
| 9,501,149 B2 | 11/2016 | Burnbaum et al. | |
| 9,513,704 B2 | 12/2016 | Heubel et al. | |
| 9,519,346 B2 | 12/2016 | Lacroix | |
| 9,535,500 B2 | 1/2017 | Pasquero et al. | |
| 9,539,164 B2 | 1/2017 | Sanders et al. | |
| 9,542,028 B2 | 1/2017 | Filiz et al. | |
| 9,557,830 B2 | 1/2017 | Grant | |
| 9,557,857 B2 | 1/2017 | Schediwy | |
| 9,563,274 B2 | 2/2017 | Senanayake | |
| 9,564,029 B2 | 2/2017 | Morrell et al. | |
| 9,594,429 B2 | 3/2017 | Bard et al. | |
| 9,600,037 B2 | 3/2017 | Pance et al. | |
| 9,600,071 B2 | 3/2017 | Rothkopf | |
| 9,607,491 B1 | 3/2017 | Mortimer | |
| 9,632,583 B2 | 4/2017 | Virtanen et al. | |
| 9,666,040 B2 | 5/2017 | Flaherty et al. | |
| 9,707,593 B2 | 7/2017 | Berte | |
| 9,710,061 B2 | 7/2017 | Pance et al. | |
| 9,727,238 B2 | 8/2017 | Peh et al. | |
| 9,733,704 B2 | 8/2017 | Cruz-Hernandez et al. | |
| 9,762,236 B2 | 9/2017 | Chen | |
| 9,829,981 B1 | 11/2017 | Ji | |
| 9,830,782 B2 | 11/2017 | Morrell et al. | |
| 9,857,872 B2 | 1/2018 | Terlizzi et al. | |
| 9,875,625 B2 | 1/2018 | Khoshkava et al. | |
| 9,886,090 B2 | 2/2018 | Silvanto et al. | |
| 9,902,186 B2 | 2/2018 | Whiteman et al. | |
| 9,904,393 B2 | 2/2018 | Frey et al. | |
| 9,921,649 B2 | 3/2018 | Grant et al. | |
| 9,927,887 B2 | 3/2018 | Bulea | |
| 9,927,902 B2 | 3/2018 | Burr et al. | |
| 9,928,950 B2 | 3/2018 | Lubinski et al. | |
| 9,940,013 B2 | 4/2018 | Choi et al. | |
| 9,977,499 B2 | 5/2018 | Westerman et al. | |
| 9,996,199 B2 | 6/2018 | Park | |
| 10,025,399 B2 | 7/2018 | Kim et al. | |
| 10,037,660 B2 | 7/2018 | Khoshkava et al. | |
| 10,061,385 B2 | 8/2018 | Churikov | |
| 10,110,986 B1 | 10/2018 | Min | |
| 10,120,478 B2 | 11/2018 | Filiz et al. | |
| 10,122,184 B2 | 11/2018 | Smadi | |
| 10,139,976 B2 | 11/2018 | Iuchi et al. | |
| 10,152,131 B2 | 12/2018 | Grant | |
| 10,235,849 B1 | 3/2019 | Levesque | |
| 10,275,075 B2 | 4/2019 | Hwang et al. | |
| 10,289,199 B2 | 5/2019 | Hoellwarth | |
| 10,346,117 B2 | 7/2019 | Sylvan et al. | |
| 10,372,214 B1 | 8/2019 | Gleeson et al. | |
| 10,382,866 B2 | 8/2019 | Min | |
| 10,390,139 B2 | 8/2019 | Biggs | |
| 10,397,686 B2 | 8/2019 | Forstner | |
| 10,430,077 B2 | 10/2019 | Lee | |
| 10,437,359 B1 | 10/2019 | Wang et al. | |
| 10,556,252 B2 | 2/2020 | Tsang et al. | |
| 10,585,480 B1 | 3/2020 | Bushnell et al. | |
| 10,649,529 B1 | 5/2020 | Nekimken et al. | |
| 2003/0117132 A1 | 6/2003 | Klinghult | |
| 2005/0036603 A1 | 2/2005 | Hughes | |
| 2005/0191604 A1 | 9/2005 | Allen | |
| 2005/0230594 A1 | 10/2005 | Sato et al. | |
| 2006/0017691 A1 | 1/2006 | Cruz-Hernandez et al. | |
| 2006/0209037 A1 | 9/2006 | Wang et al. | |
| 2006/0223547 A1 | 10/2006 | Chin et al. | |
| 2006/0252463 A1 | 11/2006 | Liao | |
| 2007/0106457 A1 | 5/2007 | Rosenberg | |
| 2007/0152974 A1 | 7/2007 | Kim et al. | |
| 2008/0062145 A1 | 3/2008 | Shahoian | |
| 2008/0062624 A1 | 3/2008 | Regen | |
| 2008/0084384 A1 | 4/2008 | Gregorio et al. | |
| 2008/0111791 A1 | 5/2008 | Nikittin | |
| 2009/0085879 A1 | 4/2009 | Dai et al. | |
| 2009/0115734 A1 | 5/2009 | Fredriksson et al. | |
| 2009/0166098 A1 | 7/2009 | Sunder | |
| 2009/0167702 A1 | 7/2009 | Nurmi | |
| 2009/0174672 A1 | 7/2009 | Schmidt | |
| 2009/0207129 A1 | 8/2009 | Ullrich et al. | |
| 2009/0225046 A1 | 9/2009 | Kim et al. | |
| 2009/0243404 A1 | 10/2009 | Kim et al. | |
| 2009/0267892 A1 | 10/2009 | Faubert | |
| 2010/0116629 A1 | 5/2010 | Borissov et al. | |
| 2010/0156818 A1* | 6/2010 | Burrough | G06F 3/016 345/173 |
| 2010/0225600 A1 | 9/2010 | Dai et al. | |
| 2010/0231508 A1 | 9/2010 | Cruz-Hernandez et al. | |
| 2010/0313425 A1 | 12/2010 | Hawes | |
| 2010/0328229 A1 | 12/2010 | Weber et al. | |
| 2011/0115754 A1 | 5/2011 | Cruz-Hernandez | |
| 2011/0128239 A1 | 6/2011 | Polyakov et al. | |
| 2011/0132113 A1 | 6/2011 | Siotis | |
| 2011/0169347 A1 | 7/2011 | Miyamoto et al. | |
| 2011/0193824 A1* | 8/2011 | Modarres | G06F 3/041 345/177 |
| 2011/0205038 A1 | 8/2011 | Drouin et al. | |
| 2011/0261021 A1 | 10/2011 | Modarres et al. | |
| 2012/0038469 A1 | 2/2012 | Dehmoubed et al. | |
| 2012/0038471 A1 | 2/2012 | Kim et al. | |
| 2012/0056825 A1 | 3/2012 | Ramsay et al. | |
| 2012/0062491 A1 | 3/2012 | Coni et al. | |
| 2012/0113008 A1* | 5/2012 | Makinen | G06F 3/016 345/168 |
| 2012/0127071 A1 | 5/2012 | Jitkoff et al. | |
| 2012/0127088 A1 | 5/2012 | Pance et al. | |
| 2012/0133589 A1* | 5/2012 | Marsden | G06F 3/04886 345/168 |
| 2012/0235942 A1 | 9/2012 | Shahoian | |
| 2012/0327006 A1 | 12/2012 | Israr et al. | |
| 2013/0016042 A1 | 1/2013 | Makinen et al. | |
| 2013/0043670 A1 | 2/2013 | Holmes | |
| 2013/0044049 A1 | 2/2013 | Biggs et al. | |
| 2013/0076635 A1 | 3/2013 | Lin | |
| 2013/0154996 A1 | 6/2013 | Trend et al. | |
| 2013/0207793 A1 | 8/2013 | Weaber et al. | |
| 2014/0062948 A1 | 3/2014 | Lee et al. | |
| 2014/0125470 A1 | 5/2014 | Rosenberg | |
| 2014/0168175 A1 | 6/2014 | Mercea et al. | |
| 2015/0084909 A1 | 3/2015 | Worfolk et al. | |
| 2015/0126070 A1 | 5/2015 | Candelore | |
| 2015/0130730 A1 | 5/2015 | Harley et al. | |
| 2015/0145657 A1* | 5/2015 | Levesque | G06F 3/016 340/407.2 |
| 2015/0234493 A1 | 8/2015 | Parivar et al. | |
| 2015/0293592 A1* | 10/2015 | Cheong | G06F 3/016 345/173 |
| 2015/0338919 A1 | 11/2015 | Weber et al. | |
| 2015/0349619 A1 | 12/2015 | Degner et al. | |
| 2016/0098107 A1 | 4/2016 | Morrell et al. | |
| 2016/0171767 A1 | 6/2016 | Anderson et al. | |
| 2016/0209979 A1 | 7/2016 | Endo et al. | |
| 2016/0293829 A1 | 10/2016 | Maharjan et al. | |
| 2016/0327911 A1 | 11/2016 | Eim et al. | |
| 2016/0328930 A1 | 11/2016 | Weber et al. | |
| 2016/0379776 A1 | 12/2016 | Oakley | |
| 2017/0003744 A1 | 1/2017 | Bard et al. | |
| 2017/0024010 A1 | 1/2017 | Weinraub | |
| 2017/0097681 A1* | 4/2017 | Ono | G06F 3/016 |
| 2017/0111734 A1 | 4/2017 | Macours | |
| 2017/0168574 A1* | 6/2017 | Zhang | G06F 3/016 |
| 2017/0249024 A1 | 8/2017 | Jackson et al. | |
| 2017/0285843 A1 | 10/2017 | Roberts-Hoffman et al. | |
| 2017/0337025 A1 | 11/2017 | Finnan et al. | |
| 2017/0357325 A1 | 12/2017 | Yang et al. | |
| 2018/0005496 A1 | 1/2018 | Dogiamis | |
| 2018/0014096 A1 | 1/2018 | Miyoshi | |
| 2018/0029078 A1 | 2/2018 | Park et al. | |
| 2018/0081438 A1 | 3/2018 | Lehmann | |
| 2018/0181204 A1 | 6/2018 | Weinraub | |
| 2018/0194229 A1 | 7/2018 | Wachinger | |

(56) References Cited

U.S. PATENT DOCUMENTS

| | | |
|---|---|---|
| 2018/0321841 A1 | 11/2018 | Lapp |
| 2019/0073079 A1 | 3/2019 | Xu et al. |
| 2019/0310724 A1 | 10/2019 | Yazdandoost |
| 2020/0004337 A1 | 1/2020 | Hendren et al. |
| 2020/0073477 A1 | 3/2020 | Pandya et al. |

FOREIGN PATENT DOCUMENTS

| | | |
|---|---|---|
| CN | 101409164 | 4/2009 |
| CN | 101436099 | 5/2009 |
| CN | 101663104 | 3/2010 |
| CN | 101872257 | 10/2010 |
| CN | 201897778 | 7/2011 |
| CN | 201945951 | 8/2011 |
| CN | 102349039 | 2/2012 |
| CN | 203405773 | 1/2014 |
| CN | 203630729 | 6/2014 |
| CN | 104679233 | 6/2015 |
| CN | 105144052 | 12/2015 |
| CN | 106133650 | 11/2016 |
| CN | 206339935 | 7/2017 |
| CN | 207115337 | 3/2018 |
| DE | 214030 | 3/1983 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| KR | 101016208 | 2/2011 |
| KR | 20130137124 | 12/2013 |
| TW | 2010035805 | 10/2010 |
| TW | 201430623 | 8/2014 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2009/156145 | 12/2009 |
| WO | WO2010/129892 | 11/2010 |
| WO | WO2013/169303 | 11/2013 |
| WO | WO2014/066516 | 5/2014 |
| WO | WO2016/091944 | 6/2016 |

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

Stein et al., "A process chain for integrating piezoelectric transducers into aluminum die castings to generate smart lightweight structures," Results in Physics 7, pp. 2534-2539, 2017.

International Search Report and Written Opinion, PCT/US2018/048733, 16 pages, dated Oct. 31, 2018.

U.S. Appl. No. 15/350,592, filed Nov. 14, 2016, pending.
U.S. Appl. No. 15/357,956, filed Nov. 21, 2016, pending.
U.S. Appl. No. 15/366,674, filed Dec. 1, 2016, pending.
U.S. Appl. No. 15/445,383, filed Feb. 28, 2017, pending.
U.S. Appl. No. 15/846,809, filed Dec. 19, 2017, pending.
U.S. Appl. No. 15/900,728, filed Feb. 20, 2018, pending.
U.S. Appl. No. 16/102,557, filed Aug. 13, 2018, pending.

"Lofelt at Smart Haptics 2017," Auto-generated transcript from YouTube video clip, uploaded on Jun. 12, 2018 by user "Lofelt," Retrieved from Internet: <https://www.youtube.com/watch?v=3w7LTQkS430>, 3 pages.

"Tutorial: Haptic Feedback Using Music and Audio—Precision Microdrives," Retrieved from Internet Nov. 13, 2019: https://www.precisionmicrodrives.com/haptic-feedback/tutorial-haptic-feedback-using-music-and-audio/, 9 pages.

"Feel what you hear: haptic feedback as an accompaniment to mobile music playback," Retrieved from Internet Nov. 13, 2019: https://dl.acm.org/citation.cfm?id=2019336, 2 pages.

"Auto Haptic Widget for Android," Retrieved from Internet Nov. 13, 2019, https://apkpure.com/auto-haptic-widget/com.immersion.android.autohaptic, 3 pages.

D-BOX Home, Retrieved from Internet Nov. 12, 2019: https://web.archive.org/web/20180922193345/https://www.d-box.com/en, 4 pages.

U.S. Appl. No. 16/377,197, filed Apr. 6, 2019, Pandya et al.

* cited by examiner

HAPTIC REALIGNMENT CUES FOR TOUCH-INPUT DISPLAYS

CROSS-REFERENCE TO RELATED APPLICATION

This application is a non-provisional patent application of, and claims the benefit to, U.S. Provisional Patent Application No. 62/553,041, filed Aug. 31, 2017, and titled "Haptic Realignment Cues For Touch-Input Displays," the disclosure of which is hereby incorporated herein by reference in its entirety.

FIELD

Embodiments described herein relate to graphical user interfaces for electronic devices, and, in particular, to systems and methods for providing haptic realignment cues to a user interacting with virtual keys of a graphical user interface presented by a touch-input display of an electronic device.

BACKGROUND

An electronic device can include a planar touch-sensitive display for presenting a graphical user interface to interact with a user. The graphical user interface can render multiple virtual keys, such as buttons or keys, that may be selected (e.g., touched) by the user to input specific information to the electronic device. However, in some cases, a user's finger may unintentionally drift while providing input to a particular virtual key, resulting in incorrect or undetected input to the electronic device.

SUMMARY

Embodiments described herein generally reference notification systems configured to generate haptic outputs, sounds, and visual effects that provide cues (e.g., alignment cues, realignment cues, centering cues, and so on) to a user to adjust or maintain that user's finger positioning when providing touch and/or force input to a particular virtual key—or other virtual input region—of a virtual keyboard shown on a graphical user interface presented or rendered by a (typically planar) touch-sensitive display of an electronic device.

In particular, in many embodiments, the notification system includes a haptic output subsystem configured to generate a global, semi-local, or local haptic output by varying one or more output characteristics of one or more global, semi-local, or local haptic output elements (e.g., vibrating elements, vertical or horizontal displacement elements, acoustic elements, electrostatic elements, and so on). The haptic output generated by the haptic output subsystem can be varied based on substantially real-time touch and/or force input to the touch-sensitive display of the electronic device. For example, the haptic output generated by the haptic output subsystem can be varied based on a location of a touch input, a magnitude of a force input, an acceleration of a gesture input, and so on. In these examples, the haptic output generated by the haptic output subsystem is configured to provide a haptic cue to the user to either maintain the user's finger positioning or, in the alternative, to adjust the user's finger positioning with respect to a particular virtual key of the virtual keyboard. In other cases, a touch input can be provided to the input surface by an object, such as a stylus.

In further embodiments, more than one haptic output can be provided by the haptic output subsystem to cue the user to adjust the user's finger positioning relative to a particular virtual key. For example, the notification system can instruct the haptic output subsystem to generate haptic outputs with properties (e.g., amplitude, frequency, location, and so on) proportional or otherwise related to a distance between the user's finger and a central region of the key. For example, if the user presses a virtual key in the center of that key, a first haptic output can be provided. As the user's finger drifts toward a boundary of the virtual key, eventually overlapping the boundary, a magnitude of the first haptic output can be changed, cuing the user to re-center the drifting finger. Once the user's finger drifts to overlap the boundary of the virtual key, a second haptic output can be provided, cuing the user to re-align the drifting finger.

In still further embodiments, the notification system is configured to generate one or more sounds to provide realignment cues to a user. For example, a first sound can be generated if the user presses a virtual key in the center. As the user's finger drifts toward a boundary of the virtual key, the first sound can be changed, cuing the user to re-center the drifting finger. Once the user's finger drifts to overlap the boundary of the virtual key, a second sound can be provided, cuing the user to re-align the drifting finger.

In still further embodiments, the notification system can trigger one or more visual effects to provide realignment cues to the user. For example, a first visual effect can be generated if the user presses a virtual key in the center. As the user's finger drifts toward a boundary of the virtual key, the first visual effect can be changed, cuing the user to re-center the drifting finger. Once the user's finger drifts to overlap the boundary of the virtual key, a second visual effect can be provided, cuing the user to re-align the drifting finger.

In still further embodiments, a notification system can be configured to provide multiple substantially simultaneous haptic outputs, acoustic outputs, and visual effects to provide realignment cues to the user.

BRIEF DESCRIPTION OF THE FIGURES

Reference will now be made to representative embodiments illustrated in the accompanying figures. It should be understood that the following descriptions are not intended to limit the disclosure to a finite set of preferred embodiments. To the contrary, it is intended that the following description covers alternatives, modifications, and equivalents as may be included within the spirit and scope of the described or depicted embodiments and as defined by the appended claims.

The use of the same or similar reference numerals in different figures indicates similar, related, or identical items.

Figure 1:
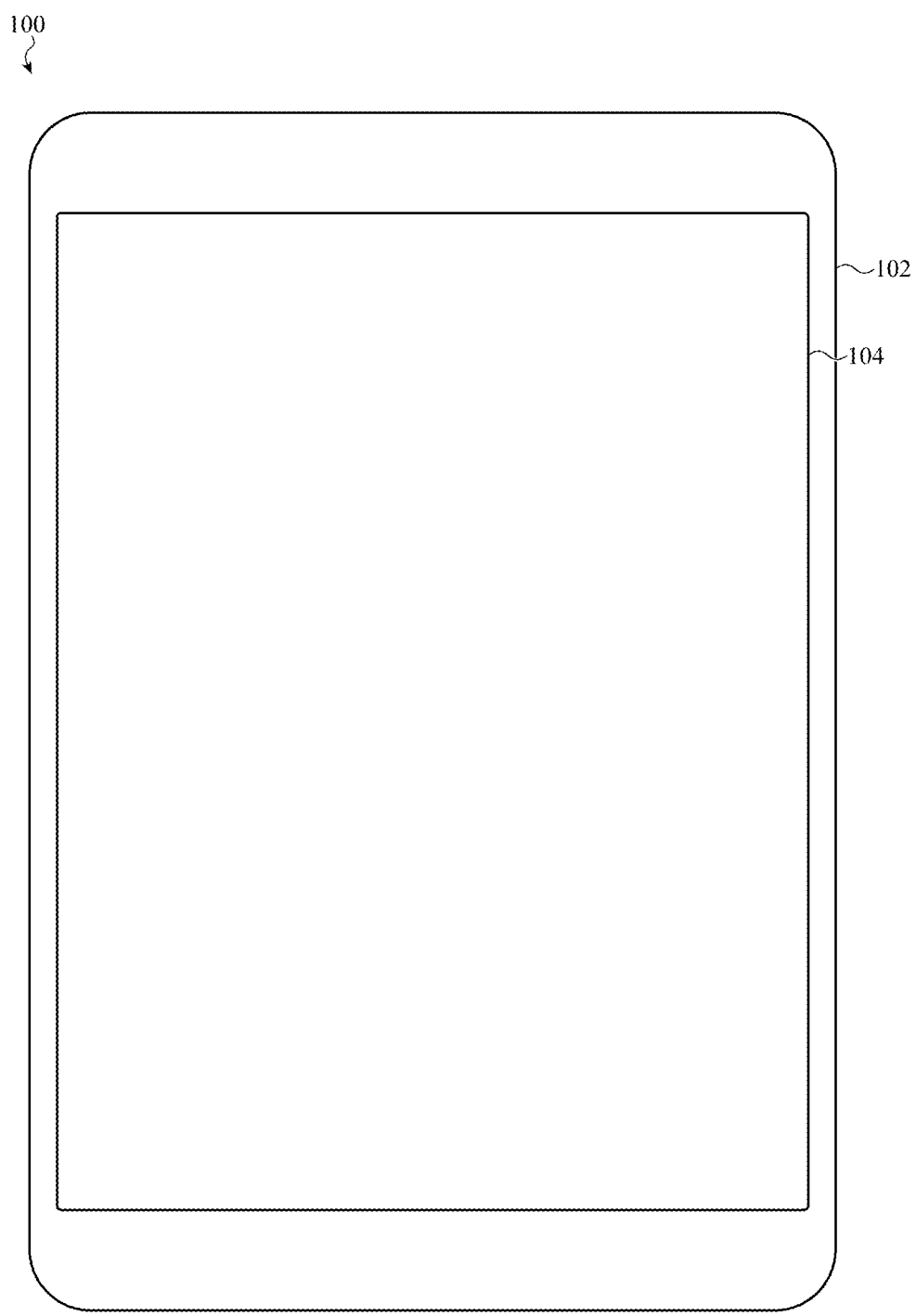
FIG. 1 depicts an electronic device that can incorporate a notification system operated in conjunction with a touch-sensitive display.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein generally reference systems and methods for providing finger realignment cues to a user interacting with an exterior surface of a touch-sensitive display.

More particularly, embodiments described herein relate to systems and methods for operating a notification system in conjunction with a graphical user interface shown on a touch-sensitive display of an electronic device. The notification system is configured to generate one or more haptic, acoustic, and/or visual outputs that provide cues (e.g., key press/make outputs, haptic realignment cues, and so on) to a user operating the keyboard. In many examples, the notification system is configured to provide the haptic, acoustic, and/or visual cues to the user to simulate or emulate a physical key press and, additionally, to encourage a user to adjust or maintain that user's finger positioning when providing input. Haptic, acoustic, and/or visual outputs can be provided separately or together and may vary from embodiment to embodiment.

For example, in one implementation, an electronic device includes a touch-sensitive display that presents a graphical user interface including a virtual keyboard with virtual keys. The user types on the virtual keyboard by touching an exterior surface of the touch-sensitive display, generally referred to herein as the "input surface." As the user touches the input surface to repeatedly press specific virtual keys, a processor of the notification system can detect drift of the user's fingers relative to a central region of one or more of the virtual keys. It may be appreciated that, as used herein, the phrase "central region" is not intended to convey precise geometrical constraints or limitations; a central region is understood to be an area or point generally located over, nearby, or adjacent to a geometric center or centroid of a virtual key (or other virtual input region).

Once a drift is detected with respect to a particular virtual key, the notification system is configured to provide one or more haptic, acoustic, and/or visual outputs to cue the user that the drifting finger should be realigned (e.g., alignment cues, realignment cues, centering cues, and so on). For example, a boundary of the virtual key can be vibrated (e.g., at a selected frequency, magnitude, and so on) by a haptic element in response to a detected drift toward that boundary. In other cases, the haptic element can be actuated after a user's finger overlaps the boundary. In another example, the input surface can be laterally shifted in the same direction as a detected drift. In yet another example, a haptic output and an acoustic output normally provided when a virtual key is pressed in the center can be increased in magnitude and volume, respectively, in response to a detected drift toward a boundary of that virtual key.

In further examples, other outputs and/or sets of outputs can be provided by the notification system to cue a user to adjust the user's finger positioning.

These and other embodiments are discussed below with reference to FIGS. 1-9. However, those skilled in the art will readily appreciate that the detailed description given herein with respect to these figures is for explanatory purposes only and should not be construed as limiting.

FIG. 1 depicts an electronic device 100 including a housing 102 and a touch-sensitive display 104. The touch-sensitive display 104 may be operated in conjunction with a notification system, such as described in detail below.

The housing 102 of the electronic device 100 can form an outer surface and protective case for the internal components of the electronic device 100, including the notification system. In the illustrated embodiment, the housing 102 is formed in a substantially rectangular shape, although this is not required. The housing 102 can be formed of one or more components operably connected together, such as a front piece and a back piece or a top clamshell and a bottom clamshell. Alternatively, the housing 102 can be formed of a single piece (e.g., uniform body). The housing 102 may be planar, or may be partially or entirely curved.

The touch-sensitive display 104 may include one or more touch sensors and/or force sensors that are configured to detect various combinations of user touch and force input on an exterior surface (e.g., the "input surface") of the touch-sensitive display 104. More specifically, the touch and/or force sensors may be used separately or in combination to interpret a broad range of user inputs such as, but not limited to: touch-based gestures; force-based gestures; touch patterns; tap patterns; single-finger gestures; multi-finger gestures; multi-force gestures; and so on. The touch sensors and/or force sensors may be configured to interpret user input by comparing real-time touch and/or force input to one or more thresholds that may be static or variable, such as, but not limited to: down-stroke force thresholds; upstroke force thresholds; movement thresholds; force magnitude thresholds; location thresholds; and so on. In addition, the touch and/or force sensors of the touch-sensitive display 104 may be configured to detect rates of change in touch input, force input, gesture input, or any combination thereof, that is provided by a user to the input surface.

The touch and/or force sensors associated with the touch-sensitive display 104 may be implemented in any number of suitable ways with any suitable technology or combination of technologies including, but not limited to: self-capacitance touch sensing; mutual capacitance touch sensing; resistive touch sensing; optical touch sensing; acoustic touch sensing; capacitive force sensing; strain-based force sensing; optical force sensing; acoustic force sensing; and so on, or any combination thereof. The touch and/or force sensors may be independently or mutually addressable and may be distributed and/or segmented and disposed relative to an active display region and/or a bezel region of the touch-sensitive display 104.

It may be appreciated that the touch-sensitive display 104 can be implemented with any suitable technology, including, but not limited to, a multi-touch or multi-force sensing touchscreen that uses liquid crystal display technology, light-emitting diode technology, organic light-emitting display technology, organic electroluminescence technology, or another type of display technology.

As noted above the electronic device 100 also includes a notification system (described in greater detail with reference to FIGS. 3A-9) that is operated in conjunction with a graphical user interface presented by the touch-sensitive display 104. The notification system is configured to provide one or more haptic, acoustic, or visual cues to a user interacting with the touch-sensitive display 104.

Figure 2:
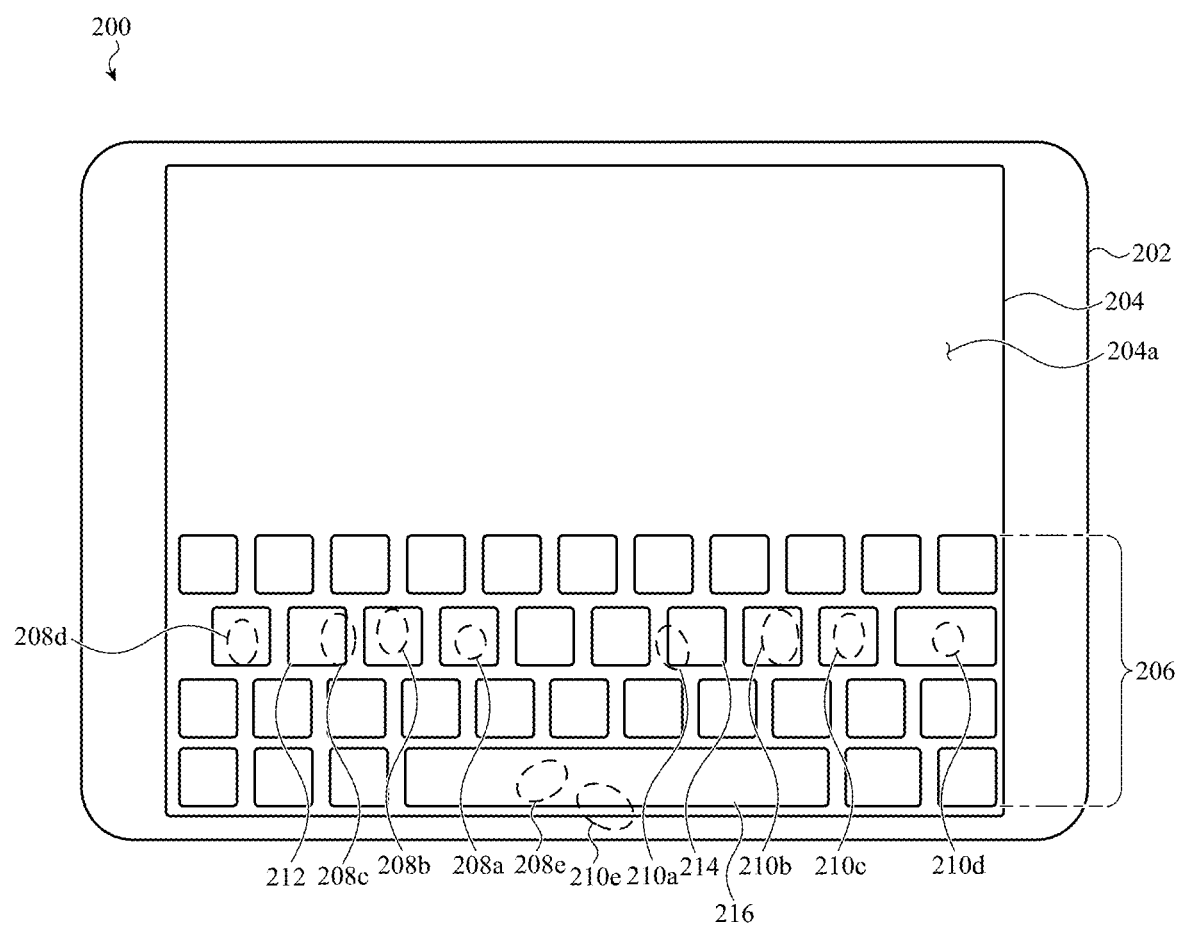
FIG. 2 depicts the electronic device of FIG. 1, specifically depicting the touch-sensitive display presenting a graphical user interface including a virtual keyboard.

For example, FIG. 2 depicts an electronic device 200 that includes a housing 202 and a touch-sensitive display 204 defining an input surface 204a that can receive a touch input from a user. The housing 202 and the touch-sensitive display 204 can be configured or implemented as described above with respect to FIG. 1, or in any other suitable manner. As with the electronic device 100 depicted in FIG. 1, the electronic device 200 includes a notification system, such as described herein.

In the illustrated example, the touch-sensitive display 204 presents a graphical user interface below the input surface 204a including a virtual keyboard 206. The virtual keyboard 206 includes several rows of virtual keys, each of which may be selected by a user by touching or applying a force to the input surface 204a (e.g., which may be a portion of the housing 202 or the touch-sensitive display 204 above the touch-sensitive display 204) above the virtual keyboard 206. In the illustrated embodiment, example touch locations of an example user's fingers on the input surface 204a are depicted by dotted ellipses. Fingers of the user's left hand are labeled as the fingers 208a-208e and fingers of the user's right hand are labeled as the fingers 210a-210e.

While typing on the virtual keyboard (e.g., contacting the input surface 204a with one or more fingers), the user's fingers may unintentionally drift on the input surface 204a away from center points or central regions of the virtual keys, resulting in incorrect or undetected input to the electronic device 200. For example, the user's left-hand third finger 208c is depicted as drifting to the right of the virtual key 212, the user's right-hand index finger 210a is depicted as drifting to the left of the virtual key 214, and the user's right-hand thumb 210e is depicted as drifting downwardly relative to the virtual key 216.

In the illustrated embodiment, the notification system (described in detail with respect to FIGS. 3A-6H) of the electronic device 200 and/or the touch-sensitive display 204 can be configured to monitor the user's finger positioning on the input surface 204a relative to one or more of the virtual keys of the virtual keyboard 206 shown on the touch-sensitive display 204.

For example, the touch-sensitive display 204 (and/or the notification system) can monitor placement of the user's right-hand index finger 210a on the input surface 204a relative to a central region of the virtual key 214 of the virtual keyboard 206. If the distance between sequential placements of the user's right-hand index finger 210a and the central region of the virtual key 214 increases beyond a threshold or at a particular rate, the touch-sensitive display 204 can determine that the user's right-hand index finger 210a has drifted on the input surface 204a. In one example, the distance between the user's touch input and the central region of the virtual key 214 is based on a distance between the centroid of the touch input and the centroid of the virtual key. In other examples, the distance between the user's touch input and the central region of the virtual key is the minimum distance between the centroid of the virtual key and a perimeter of an area corresponding to the user's touch input. These are merely examples; it may be appreciated that any suitable distance measurement or representation of relative separation between a user's touch input and the central region of the virtual key can be used.

In response to the touch-sensitive display 204 (and/or the notification system) detecting drift, the notification system can generate one or more haptic outputs through the input surface 204a to cue the user to adjust the positioning of the user's right-hand index finger 210a back toward the central region of the virtual key 214. For example, the notification system can include a haptic output subsystem configured to locally vibrate the virtual key 214 to cue the user to adjust the positioning of the user's right-hand index finger 210a back toward the central region of the virtual key 214. In some examples, the virtual key 214 can be vibrated at a frequency between 100 Hz and 200 Hz. In other cases, the virtual key 214 can be vibrated at a higher frequency, such as an ultrasonic frequency.

In other cases, the notification system can generate one or more acoustic outputs via a speaker within the electronic device 200 to cue the user to adjust the position of the user's right-hand index finger 210a back toward the central region of the virtual key 214. For example, the notification system can generate different sounds based on the user's finger position relative to the virtual key 214. For example, the notification system can generate a sharp click sound when the user's right-hand index finger 210a presses the virtual key 214 when correctly aligned with the central region and a dull or hollow sound when the user's right-hand index finger 210a presses the virtual key 214 when incorrectly aligned with the central region of the virtual key 214.

In yet other examples, the notification system can generate one or more visual effects via the touch-sensitive display 204 to cue the user to adjust the position of the user's right-hand index finger 210a back toward the central region of the virtual key 214. For example, the notification system can generate an after-image corresponding to an incorrect placement of the user's right-hand index finger 210a.

Further example operations that may be performed by the notification system in response to a detected finger drift, include, but may not be limited to: vibrating a boundary of the virtual key 214; vibrating a boundary of the virtual key 214 at a different frequency or amplitude than a central region of the virtual key 214; vibrating a region of the input surface 204a between adjacent keys; increasing or decreasing friction between the user's finger and the input surface 204a; increasing or decreasing friction between the user's finger and a boundary of the virtual key 214; increasing or decreasing friction between the user's finger and a region of the input surface 204a between adjacent keys; increasing or decreasing a magnitude of a haptic and/or acoustic click output provided when the user presses the virtual key 214; changing an appearance of the virtual key 214 (e.g., increasing brightness, decreasing brightness, changing color, changing shading, and so on); flashing or highlighting a portion of the graphical user interface presented on the touch-sensitive display 204; increasing or decreasing a temperature of the input surface 204a; and so on, or any combination thereof.

Further, in some embodiments, outputs provided by the notification system can, without limitation: change over time (e.g., become more pronounced if ignored by the user); vary from user to user; vary from finger to finger; vary based on a location of a particular virtual key or virtual input region; vary based on a user setting; vary based on a system setting; vary based on an application setting; vary based on an orientation or position of the electronic device 200; vary based on a typing history of the user; vary based on detected grammar or spelling error rates; vary based on ambient light and/or sound detected by a sensor of the electronic device 200; vary based on environmental conditions (e.g., ambient sound levels, ambient light levels, ambient temperature, ambient humidity, and so on); and so on, or any combination thereof.

Accordingly, it is appreciated that a notification system—such as described herein—can be suitably configured to cue a user to realign that user's finger by providing any combination of haptic, acoustic, and/or visual output relative to any virtual key or virtual input region of a graphical user interface presented by a touch-sensitive display of an electronic device, such as the electronic device 200.

However, as may be appreciated, certain combinations of outputs provided by a notification system may be more effective to cue a user to realign that user's fingers than others. For example, in many cases, haptic outputs can more effectively solicit a user's attention than acoustic or visual outputs. Further, certain haptic outputs (or combinations of haptic outputs) may be more effective to solicit a particular user's attention than others; haptic effects may vary from device to device, user to user, application to application, implementation to implementation, virtual input region to virtual input region, and so on.

FIGS. 3A-4B are provided in reference to certain example haptic outputs that may be provided by a haptic output subsystem of a notification system, such as described herein.

More specifically, a haptic output subsystem of a notification system such as described herein is typically configured to provide haptic output to a user, localized to a virtual input region (e.g., a virtual key) of a graphical user interface shown on a display. As a result of this construction, as a user provides a touch input to the input surface above the virtual input region, the user perceives a localized haptic output, and associates that haptic output with the virtual input region itself, cuing the user to position the user's finger generally in the center region of the virtual input region.

Accordingly, the phrase "haptic output," as used herein, broadly encompasses an output provided one or more components of a haptic output subsystem that stimulates a user's sense of touch and/or a user's perception related to the user's sense of touch including, but not necessarily limited to, a sense of surface temperature, a sense of surface topology, a sense of surface friction, a sense of numbness, a sense of mechanical pressure, a sense of mechanical distortion, a sense of motion, a sense of vibration, a sense of stickiness, a sense of slipperiness, a sense of attraction, and so on or any combination thereof. Similarly, the phrase "haptic output subsystem" as used herein broadly encompasses the components, or groups of components, that may be used by or with a notification system to stimulate a user's sense of touch and/or affect a user's perception related to the user's sense of touch.

A haptic output subsystem, such as may be used in conjunction with the embodiments described in reference to FIGS. 3A-6H, includes one or more haptic elements. A haptic element can be any component or group of components configured to generate a haptic output that can be felt by a user. For example, a haptic element can be configured to move or vibrate the input surface, affect temperature of the input surface, affect friction between the user and the input surface, and so on. Haptic elements can include, but are not limited to, acoustic transducers (e.g., voice coil, piezoelectric elements or piezoelectric materials, and so on), thermal elements (e.g., resistive heaters, Peltier elements, and so on), and electrostatic plates. In other cases, other haptic elements or haptic element types may be associated with a haptic output subsystem, such as described herein.

Example output characteristics of a haptic element that can be controlled by the haptic output subsystem can include, but may not be limited to: a frequency, amplitude, duty cycle, envelope, and/or phase of a haptic element configured to move or vibrate an input surface; an absolute temperature, temperature gradient, and/or relative temperature of a haptic element configured to affect temperature of an input surface; an electrostatic field magnitude, frequency, duty cycle, and so on of a haptic element configured to affect friction between the user and an input surface by electrostatic attraction; a frequency, amplitude, duty cycle, envelope, and/or phase of a haptic element configured to ultrasonically move or vibrate an input surface to affect friction between the user and the input surface; and so on. In still further embodiments, other output characteristics may be controlled or influenced by a haptic output subsystem such as described herein.

In many embodiments, including those referenced below with respect to FIGS. 3A-4B, a haptic output subsystem can simultaneously actuate different haptic elements with different output characteristics such that an aggregate output of the haptic output subsystem is a unique haptic effect that is perceivably different from the individual haptic outputs of the actuated haptic elements. In such examples, a single haptic element can be associated with a single virtual input region or, in other embodiments, multiple haptic elements can be associated with (e.g., positioned below or relative to) a single virtual input region.

For example, multiple vibrating haptic elements (see, e.g., FIGS. 6A-6H) can be actuated simultaneously with different output characteristics (e.g., frequencies, phases, amplitudes, and so on) to produce vibrations that constructively and/or destructively interfere while propagating through the input surface. Such examples are discussed below with reference to FIGS. 3A-4B.

In one implementation, haptic output from one haptic element can be configured to produce vibrations that cancel vibrations produced by another haptic element in order to define a non-vibrating region of the input surface. In this implementation, the haptic effect generated by the haptic output subsystem can be characterized by the location(s) and boundary(s) of vibrating and non-vibrating regions of the input surface that result, in aggregate, from the haptic outputs of the individually-actuated haptic elements. Such examples are discussed below with reference to FIGS. 5-6H.

In another implementation, a set of vibrating haptic elements—positioned below or relative to a single virtual input region or positioned below or relative to multiple virtual input regions—can each be actuated with specific output characteristics (e.g., frequencies, phases, amplitudes, and so on) that produce vibrations corresponding to frequency components of a finite series that represents (or approximates) the shape of an arbitrary function (e.g., impulse function, square wave, triangle wave, saw tooth wave, or any other suitable periodic function). The various vibrations produced by the haptic elements constructively and/or destructively interfere while propagating through the input surface, causing the input surface to locally deform or displace to take the general shape of the periodic function. In this implementation, the haptic effect generated by the haptic output subsystem can be characterized by the location(s), boundary(s), and contour(s) of the deformations or displacements of the input surface that result, in aggregate, from the vibrations produced by the haptic outputs of the actuated haptic elements.

Figure 3A:
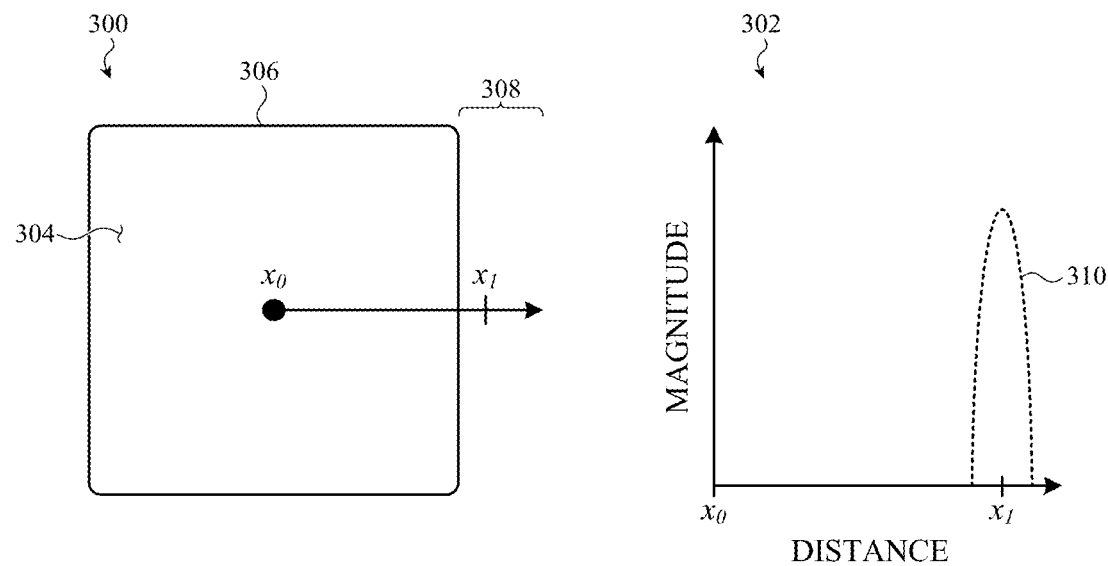
FIG. 3A depicts a virtual key that may be touched by a user and, additionally, a simplified graph depicting an example relationship between the output of a notification system, such as described herein, and the location of the user's finger relative to a boundary of the virtual key.

In one specific example, an impulse function can be approximated by a sum of sinusoidal waveforms (see, e.g., FIG. 3A). In this example, a group of haptic elements of a haptic output subsystem associated with an input surface can be actuated with specific output characteristics (e.g., specific frequencies, phases, and amplitudes) each corresponding to at least one of a particular selected sinusoidal waveform. In this manner, the vibrations in the input surface produced by each actuated haptic element correspond to at least one respective frequency component of a finite series that approximates the shape of an impulse function. In other words, the vibrations cause the input surface to deform and/or displace to take the shape of an impulse function. In this example, the contours of the impulse function waveform (e.g., edges, peaks, and so on) may be felt by a user touching the input surface while the haptic elements are actuated by the haptic output subsystem. In this implementation, the haptic effect generated by the haptic output subsystem can be characterized by the location(s), boundary(s), and contour(s) of the sharp and/or defined edges characterized by the impulse waveform-shaped deformation of the input surface.

In further implementations, additional haptic elements can be actuated to refine or supplement particular haptic effect(s) generated by the haptic output subsystem. For example, an electrostatic plate can generate an electric field that attracts the user's finger to a particular region of the input surface. An adjacent electrostatic plate may generate an electric field of opposite polarity. In this example, when the user draws a finger from the first electrostatic plate to the second electrostatic plate, a change in friction may be perceived by the user due to the inversion of the electric field magnitude. In this implementation, the haptic effect generated by the haptic output subsystem can be characterized by the location(s), boundary(s), and magnitude(s) of the electrostatic fields generated by the haptic output subsystem of the input surface.

In yet another example, a haptic output subsystem such as described herein (e.g., in reference to FIGS. 3A-6H) can supplement a haptic effect generated by vibrating haptic elements with a haptic effect generated by one or more electrostatic plates. For example, a haptic effect of an impulse function, perceived by a user as a bump extending from an input surface, can be supplemented by a haptic effect of a change in friction across the bump extending from the input surface.

In another example, a thermal element (e.g., a Peltier element, heat pump, resistive heater, inductive heater, and so on) can increase or decrease a temperature of a particular region of the input surface. For example, the thermal element can locally increase a temperature of a region of the input surface. An adjacent thermal element can locally decrease the temperature of a second region of the input surface. In this example, when the user draws a finger from the first region to the second region, a change in temperature may be perceived by the user. In this implementation, the haptic effect generated by the haptic output subsystem can be characterized by the location(s), boundary(s), and magnitude(s) of the various temperature gradients generated by the haptic output subsystem.

In still further embodiments, a haptic output subsystem can be operated and/or configured to produce a series or set haptic effects that are collectively configured to simulate the presence of a physical component (e.g., button, switch, key, rocker, slider, dial, and so on) on the input surface. In many cases, the simulated physical component corresponds to a virtual input region below the input surface. In particular, the haptic output subsystem in these examples associates a set of particular haptic effects with a set of particular combinations of user touch and/or force input. In these examples, each haptic effect generated by the haptic output subsystem simulates a particular response or characteristic exhibited by the simulated physical component when the user interacts with that component in a specific way. In this manner, by simulating multiple responses or characteristics of the physical component in response to particular user input, the haptic output subsystem can cause the user to perceive that the physical component is present on the input surface.

Accordingly, generally and broadly, it is understood that a haptic output subsystem such as described herein is configured to produce haptic effects that simulate and/or approximate the various static or dynamic mechanical, physical, or textural attributes or properties that may be exhibited by a physical component when a user interacts with that component by touching, feeling, rotating, tapping, pushing, pulling, pressing, releasing, or otherwise physically interacting with the component in a specific or particular manner. These haptic effects cue a user to align the user's finger with a central region of an associated virtual input region, such as a virtual key of a virtual keyboard.

For example, when a user places a finger on a physical key of a keyboard, the user can interact with the key in a number of ways (e.g., by touching, pressing, feeling, tapping, and so on), each of which may be associated with a different set of haptic effects or outputs that inform the user's perception of properties of the key including size, location, shape, height, texture, material, rigidity, flexibility, and so on. Such interactions might include drawing a finger across a surface or edge of the key by touching or feeling, pressing the key with different magnitudes of force, holding the key in a specific position, sliding a finger across a surface of the key, wiggling the key, and so on. Each of these different interactions can be associated with different haptic effects or outputs that inform the user's perception of that particular key in a unique way. These haptic outputs can include, but may not be limited to, a sharpness or roundness of an edge of the key, a texture of a surface of the key, a concavity or convexity of the key, a rattle or wobble of the key, a presence or absence of surface features, a stiffness or elasticity of the key, a smoothness or discontinuousness of travel when the key is pressed, a magnitude of force required to actuate the key, and so on.

For simplicity of description and illustration, FIGS. 3A-4B are provided herein to illustrate specific simplified example outputs of a haptic output subsystem such as described herein. However, it is appreciated that these examples—in addition to the examples referenced above—are not exhaustive; additional haptic effects that can be provided in response to additional user input may be provided in further embodiments to simulate different physical input components, non-input objects or features (e.g., surface characteristics, textures, and so on), or for any other suitable purpose.

In particular, the embodiments shown in FIGS. 3A-4B each depict a virtual key that may be touched by a user. The virtual key, as with other embodiments described herein, can be presented by a graphical user interface shown on a touch-sensitive display that is operated in conjunction with a notification system, such as described herein. The notification system includes a haptic output subsystem configured to generate localized haptic effects—such as those described above—through an input surface above the touch-sensitive display that may be touched by a user.

In particular, FIG. 3A depicts a virtual key 300. The haptic output subsystem in this example (not shown) is configured to produce a haptic output, such as a vibration or an impulse, in response to detecting that a user's finger has drifted away from a central point $x_0$ of the virtual key 300. In particular, a graph 302 is provided showing that when the user's finger drifts along the input surface 304 above the virtual key 300 (e.g., from the central point $x_0$, across the boundary 306 that defines a perimeter of the virtual key 300) into an adjacent region 308 (e.g., point $x_1$), a haptic effect 310 is generated by the haptic output subsystem to cue the user to readjust the user's finger positioning. The haptic effect 310 is illustrated as an impulse (e.g., a sharp, or high-frequency vibration) localized to the adjacent region 308, but this may not be required.

In another non-limiting phrasing, the haptic output subsystem is configured to generate a localized haptic effect, adjacent to the virtual key, when the user's finger drifts in that direction. In this manner, the haptic output subsystem provides a cue to the user to readjust the user's finger positioning back toward the central point $x_0$.

It may be appreciated that the haptic effect 310 can be any suitable haptic output or combination of haptic outputs including, but not limited to: a high-frequency vibration; a low-frequency vibration; a high-friction effect; a low-friction effect; a high-temperature effect; a low-temperature effect; a click effect; a lateral shift or mechanical displacement of the input surface (in any planar direction generally parallel to the input surface); a vertical mechanical displacement of the input surface (in any direction generally perpendicular to the input surface); and so on. As with other embodiments described herein, the magnitude (and/or other characteristics) of the haptic effect 310 can be based on the real-time touch or force input, user history, device settings, and so on.

Figure 3B:
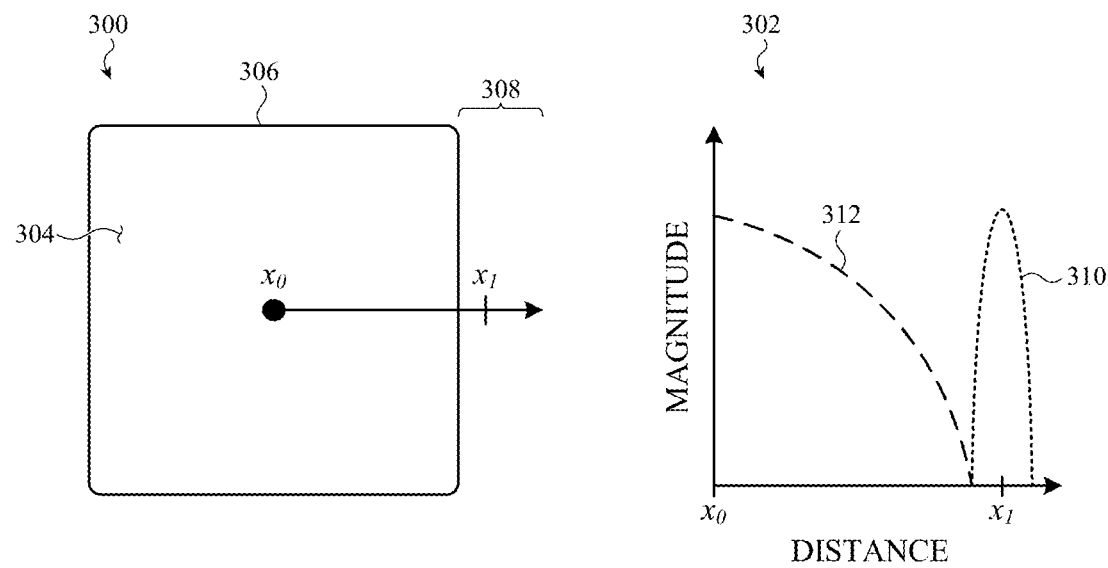
FIG. 3B depicts a virtual key and, additionally, a simplified graph depicting an example relationship between the output of a notification system, such as described herein, and the location of the user's finger relative to a center point and a boundary of the virtual key.

In other embodiments and implementations, a haptic output subsystem can be configured to provide different haptic outputs. For example, FIG. 3B depicts a virtual key 300. The haptic output subsystem in this example (also not shown) is configured to produce two different haptic outputs. One of the haptic outputs is localized to the surface of the virtual key 300, and a second haptic output is localized to a region adjacent to the virtual key 300.

More particularly, as with FIG. 3A, the graph 302 shown in FIG. 3B shows that when the user's finger drifts along the input surface 304 above the virtual key 300 from the central point $x_0$ toward the boundary 306, a haptic effect 312 is provided. The haptic effect 312 in this example has a magnitude that changes continuously as a function of the distance between the user's finger and the central point $x_0$. More particularly, the closer the user's finger is to the boundary 306 of the virtual key 300, the lower the magnitude of the haptic effect 312. Once the user crosses the boundary, the haptic effect 310 can be provided as described in reference to FIG. 3A.

In another non-limiting phrasing, the haptic output subsystem in this example is configured to generate a localized haptic effect when the user presses the virtual key correctly, diminishing that effect as the user's finger drifts toward an edge of the virtual key. Once the user's finger has crossed the perimeter or boundary of the virtual key so as to at least partially overlap the perimeter or boundary, a different haptic output is provided.

Figure 4A:
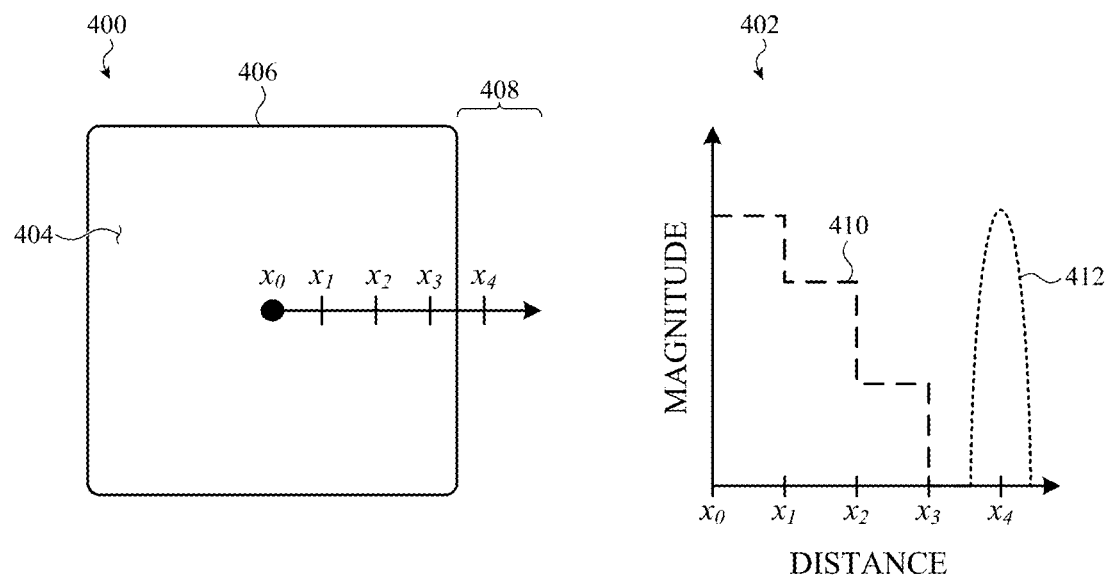
FIG. 4A depicts a virtual key and, additionally, a simplified graph depicting another example relationship between the output of a notification system, such as described herein, to the location of the user's finger relative to a center point and a boundary of the virtual key.

The haptic effect 312 is depicted as a continuous function of distance from the central point $x_0$, but this is not required. For example, FIG. 4A depicts a virtual key 400. The haptic output subsystem in this example (also not shown) is configured to produce two different haptic outputs. One of the haptic outputs is localized to the surface of the virtual key 400, and a second haptic output is localized to a region adjacent to the virtual key 400.

More particularly, as with FIGS. 3A-3B, the graph 402 shown in FIG. 4A shows that when the user's finger drifts along the input surface 404 above the virtual key 400, from the central point $x_0$ toward the boundary 406 (and, eventually into a region adjacent to the virtual key 400, identified as the adjacent region 408), a haptic effect 410 is provided. The haptic effect 412 in this example has a magnitude that changes discretely as a function of the distance between the user's finger and the central point $x_0$. In another phrasing, the magnitude (or another output characteristic, such as frequency) of the haptic effect 410 differs based on a subarea of the input surface 404 selected by the user. Once the user crosses the boundary, the haptic effect 410 can be provided as described in reference to FIGS. 3A-3B.

Figure 4B:
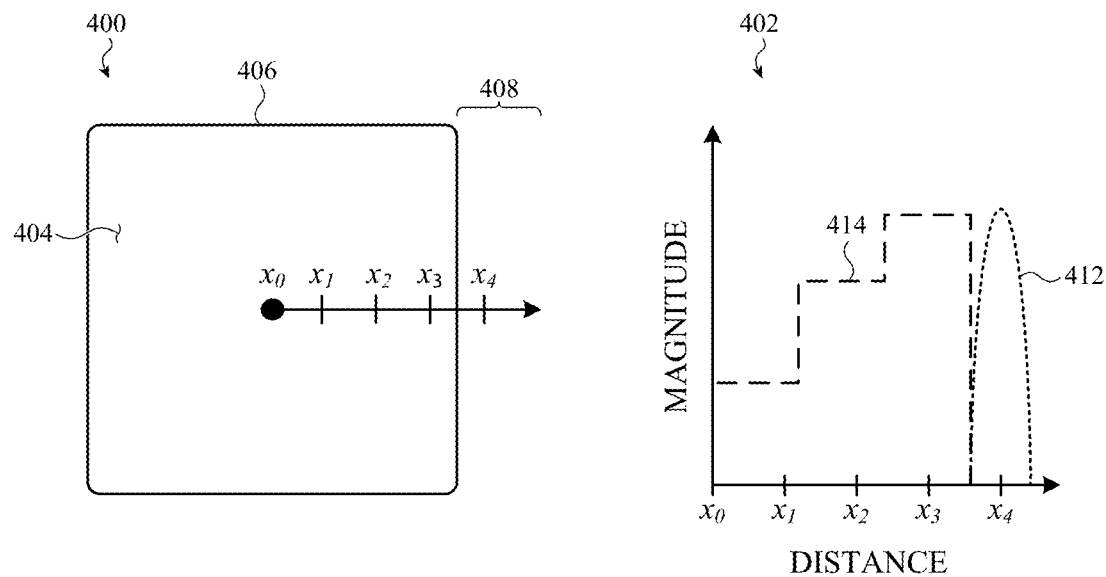
FIG. 4B depicts a virtual key and, additionally, a simplified graph depicting another example relationship between the output of a notification system, such as described herein, and the location of the user's finger relative to a center point and a boundary of the virtual key.

In still other examples, a haptic effect provided by a haptic output subsystem need not decrease as a function of a user's touch location away from a central point or central region of a virtual key. For example, FIG. 4B shows an alternate implementation of the embodiment depicted and described in reference to FIG. 4A. In this example, a haptic effect 414 increases in magnitude (discretely, although continuous embodiments are possible as well) as the user's finger drifts away from the central region of the virtual key 400.

The foregoing description of the embodiments depicted in FIGS. 3A-4B, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of a haptic output subsystem of a notification system are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
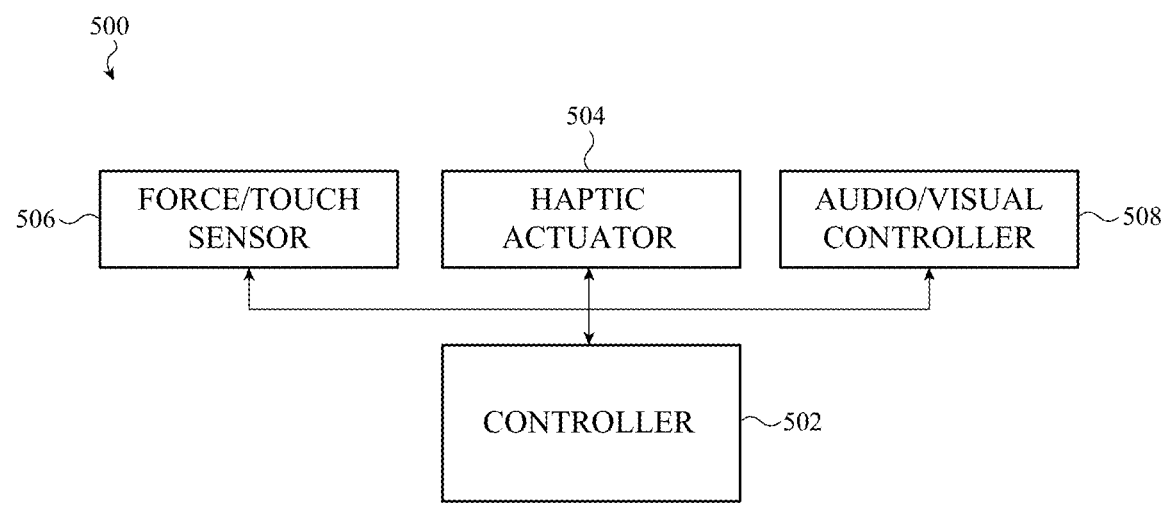
FIG. 5 depicts a simplified system diagram of a notification system such as described herein.

For example, it may be appreciated that a haptic output subsystem, such as described above, may be implemented in a number of suitable ways. In addition, a haptic element of a haptic output subsystem can be implemented in a number of suitable ways. FIGS. 5-6H are provided to illustrate example configurations of a haptic output subsystem and a haptic element that may be used with a haptic output subsystem.

FIG. 5 depicts a system diagram of an example haptic output subsystem 500. The haptic output subsystem 500 includes a controller 502 (such as a processor) that is coupled to a haptic actuator 504 (or haptic element), such as an electrostatic plate, a vibrating haptic element, or a thermal element. The controller 502 is also coupled to an input sensor 506 configured to detect a magnitude, location, and/or direction of force input and touch input to an input surface (e.g., detected by one or more of a force sensor or a touch sensor disposed relative to the input surface). In some embodiments, the controller 502 is also in communication with other systems or subsystems of a notification system, such as an acoustic controller or a graphic controller 508.

The controller 502 can be implemented with any electronic device capable of processing, receiving, or transmitting data or instructions. For example, the controller 502 can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor. Accordingly, as described herein, the phrase "processing unit" or, more generally, "processor" refers to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing elements or combination of elements.

The controller 502, in many embodiments, can include or can be communicably coupled to circuitry and/or logic components, such as a dedicated processor and a memory. The circuitry of the controller 502 can perform, coordinate, and/or monitor one or more of the functions or operations associated with the haptic output subsystem 500 including, but not limited to: increasing the temperature of an area of an input surface; decreasing the temperature of an area of an input surface; decreasing the temperature surrounding an area of an input surface; increasing the temperature surrounding an area of an input surface; detecting, approximating, and/or measuring the temperature of an area of an input surface; increasing the friction exhibited by an area of an input surface; decreasing the friction exhibited by an area of the input surface; increasing the friction exhibited surrounding an area of an input surface; decreasing the friction exhibited surrounding an area of an input surface; increasing a vibration emanating from a local area of an input surface; decreasing a vibration output from one or more haptic actuators; generating a vibration that constructively interferes with a vibration propagating through an area of an input surface; generating a vibration that destructively interferes with a vibration propagating through an area of an input surface; measuring, estimating and/or determining a frequency, amplitude and/or phase of a vibration propagating through an area of an input surface; and so on or any combination thereof. In some examples, the controller 502 may use time multiplexing techniques to obtain measurements from and to apply signals to each independent element of each portion of a haptic output subsystem 500.

In further embodiments, the haptic output subsystem 500 can be operated and/or configured to produce a series or set of haptic effects (together with, or independent of acoustic or visual effects generated or controlled by the acoustic controller or graphic controller 508) that are collectively configured to simulate the presence of a physical component, a physical boundary, a physical texture, and so on at one or more locations or regions of the input surface.

In particular, as noted above, the haptic output subsystem can simulate any arbitrary physical component by associating a set of particular haptic effects with a set of particular combinations of user touch and/or force input. In these examples, each haptic effect generated by the haptic output subsystem simulates a particular response or characteristic exhibited by the physical component when the user interacts with that component in a specific way. In this manner, by simulating multiple responses or characteristics of the physical component in response to particular user input, the haptic output subsystem can provide finger realignment cues to a user.

Figure 6A:
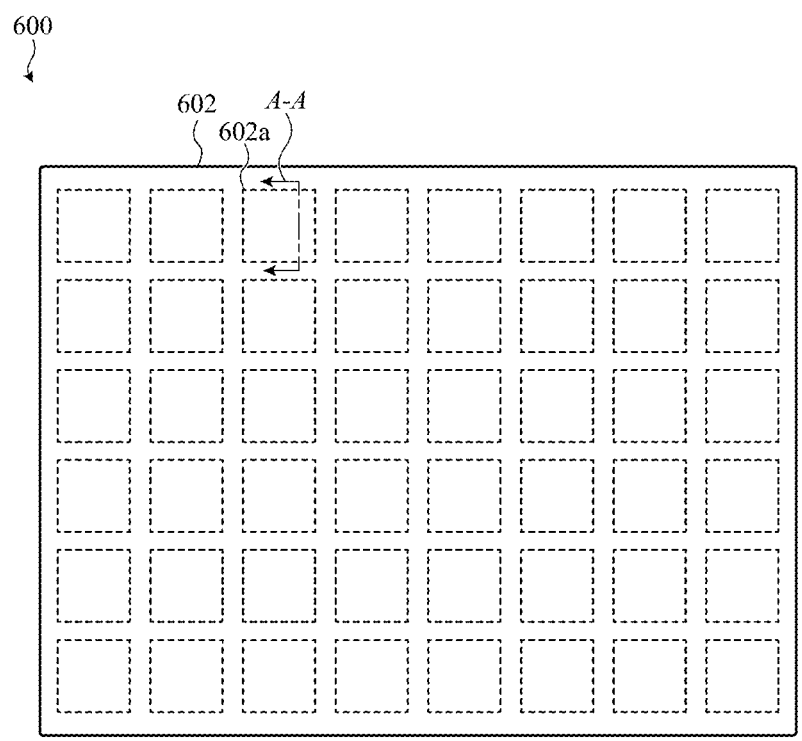
FIG. 6A depicts a simplified view of a haptic output subsystem including a set of haptic elements that may be positioned below an input surface of a touch-sensitive display.

For example, FIG. 6A depicts a simplified view of haptic output subsystem 600, including a number of individually-addressable individual haptic elements, that can be associated with an input surface 602. As noted above, the haptic output subsystem can be appropriately configured to simulate a physical component, boundary, texture, or object by generating haptic effects with one or more haptic elements coupled to the input surface 602. In the illustrated embodiment, a set of haptic elements are illustrated in phantom to indicate that the haptic elements are positioned below the input surface. One of the haptic elements is identified as the individually-addressable haptic element 602a.

The individually-addressable haptic element 602a can be implemented in a number of ways. For example, the individually-addressable haptic element 602a can include one or more, without limitation: lateral displacement elements; vertical displacement elements; low-frequency vibration elements; high-frequency vibration elements; ultrasonic vibration elements; electrostatic elements; thermal elements; and so on. For simplicity of description and illustration, the embodiments that follow reference implementations of the individually-addressable haptic element 602a that are configured to displace or vibrate the input surface 602. However, it may be appreciated that other example embodiments can include other haptic elements, such as those referenced above.

More specifically, FIGS. 6B-6H depict various example embodiments of the individually-addressable haptic element 602a, viewed through the section line A-A of FIG. 6A.

Figure 6B:
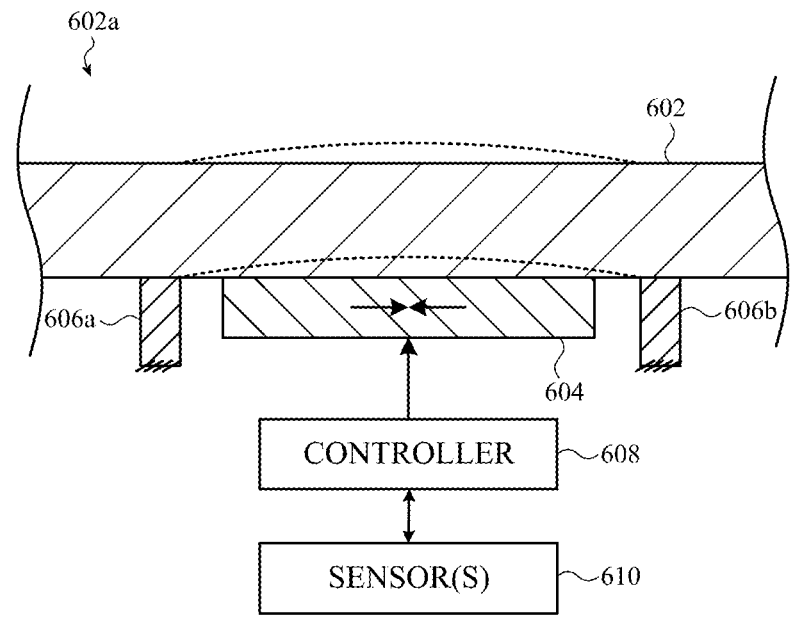
FIG. 6B depicts a simplified cross-section, taken through section line A-A of FIG. 6A, of an example haptic element of the haptic output subsystem of FIG. 6A, specifically showing an outward deformation of the input surface in response to an actuation of the haptic element.
Figure 6C:
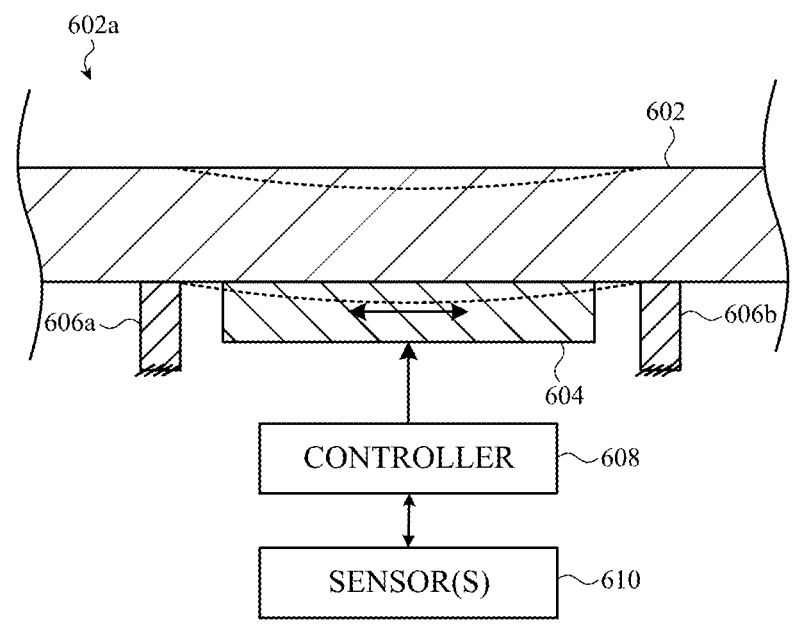
FIG. 6C depicts the haptic element of FIG. 6B, specifically showing an inward deformation of the input surface in response to an actuation of the haptic element.
Figure 6D:
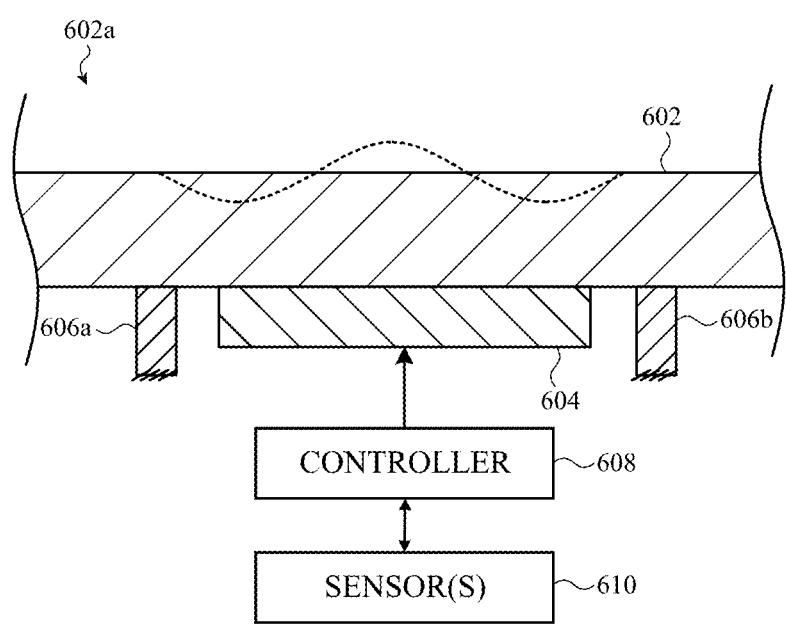
FIG. 6D depicts the haptic element of FIG. 6B, specifically showing an arbitrary deformation of the input surface in response to an actuation of the haptic element.
Figure 6E:
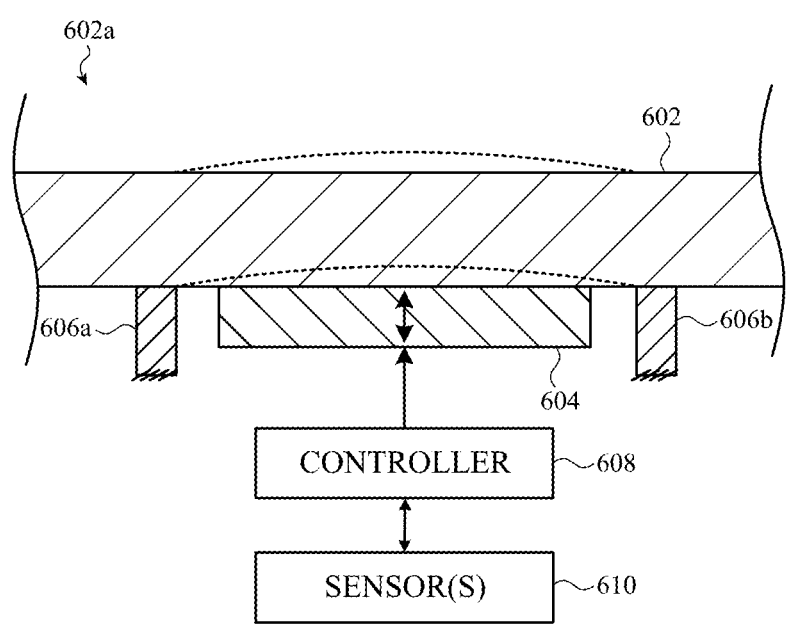
FIG. 6E depicts a simplified cross-section of another example haptic element that can be associated with the haptic output subsystem of FIG. 6A.

In some embodiments, such as shown in FIGS. 6B-6E, the individually-addressable haptic element 602a includes a haptic element 604 that is coupled directly or indirectly to an interior surface of the input surface 602. The haptic element 604 is configured to compress (FIG. 6B) and/or expand (FIG. 6C) in response to an actuation. For the embodiments depicted in FIGS. 6B-6D, the haptic element 604 compresses or expands along an axis generally parallel to the input surface 602. In this manner, the haptic element 604 induces a localized bending moment into the input surface 602 when actuated. The bending moment causes the input surface 602 to deform vertically, in a positive direction (see, e.g., FIG. 6B) or negative direction (see, e.g., FIG. 6B) relative to the input surface 602. In other cases, the bending moment causes the input surface 602 to vibrate, such as shown in FIG. 6D. In other cases, such as shown in FIG. 6E, the haptic element 604 is compresses or expands along an axis generally perpendicular to the input surface 602.

The haptic element 604 can be a piezoelectric element, an acoustic transducer, an electrically deformable material (e.g., nitinol), an electromagnet and attractor plate (see, e.g., FIG. 6G), or any other suitable element. In other cases, the haptic element 604 may be an eccentrically weighted motor, linear actuator, or any other suitable mechanical element.

In some embodiments, the input surface 602 can be supported by one or more stiffeners or backing plates. The stiffeners/backing plates can locally increase a rigidity of the input surface 602 such that an output generated by the haptic element 604 is localized to a greater extent. In FIGS. 6B-6H, a stiffener 606 (depicted in cross section, with left-hand and right-hand portions of the stiffener 606 identified as the stiffener sections 606a, 660b respectively) is coupled to the input surface 602. The stiffener 606 in one example can be a ring that circumscribes the haptic element 604. In another example, the stiffener 606 includes two portions, a first portion 606a and a second portion 606b. The first and second portions of the stiffener can be coupled together or may be discrete, independent parts.

As with other embodiments described herein, the haptic output subsystem 600 (as depicted in FIG. 6B) also includes a controller 608. The controller 608 can be a processor and/or electrical circuit appropriately configured to apply a signal to the haptic element 604 to cause the haptic element 604 to generate haptic output. The controller 608 can be configured to vary one or more characteristics of the signal (e.g., voltage, current, frequency, amplitude, phase, envelope, duty cycle, and so on) in order to vary the haptic output characteristics of the haptic element 604.

In many cases, the controller 608 is in communication with one or more components of the input surface, such as a force/touch input sensor 610. The controller 608 can receive data or information from these components and may alter characteristics of signals provided by the controller 608 to the haptic element 604 based on the received data or information. For example, the controller 608 can vary characteristics of signals provided by the controller 608 to the haptic element 604 based on a magnitude of force detected by the force/touch input sensor 610.

Figure 6F:
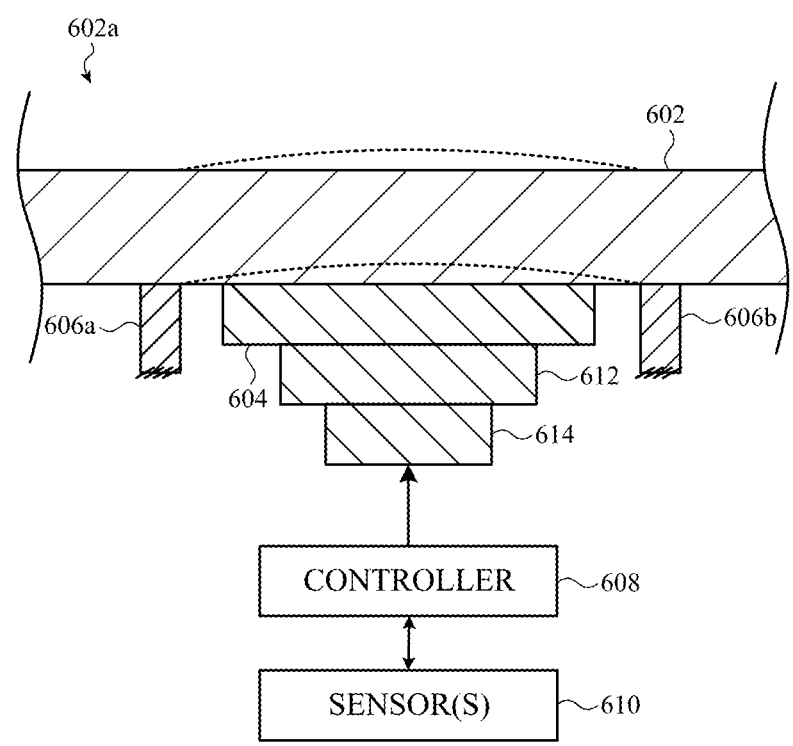
FIG. 6F depicts a simplified cross-section of yet another example haptic element that can be associated with the haptic output subsystem of FIG. 6A.
Figure 6G:
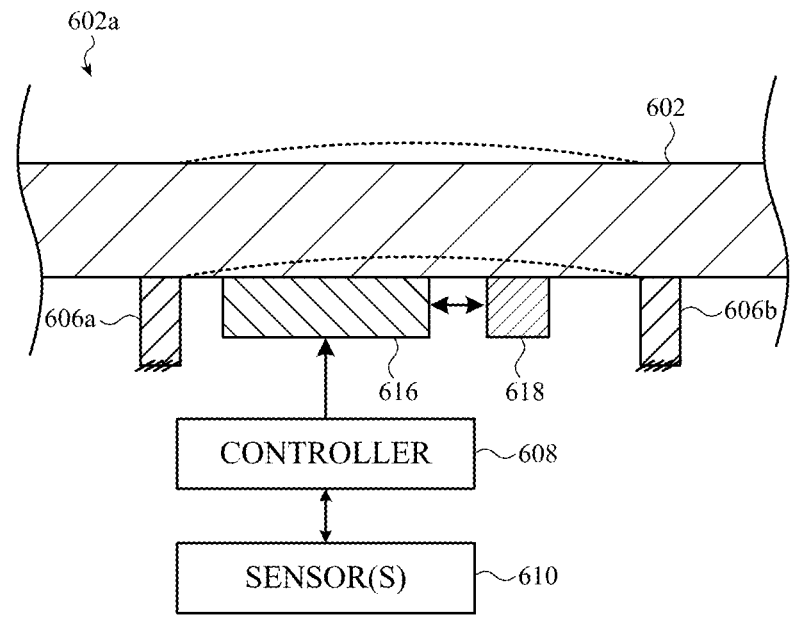
FIG. 6G depicts a simplified cross-section of yet another example haptic element that can be associated with the haptic output subsystem of FIG. 6A.
Figure 6H:
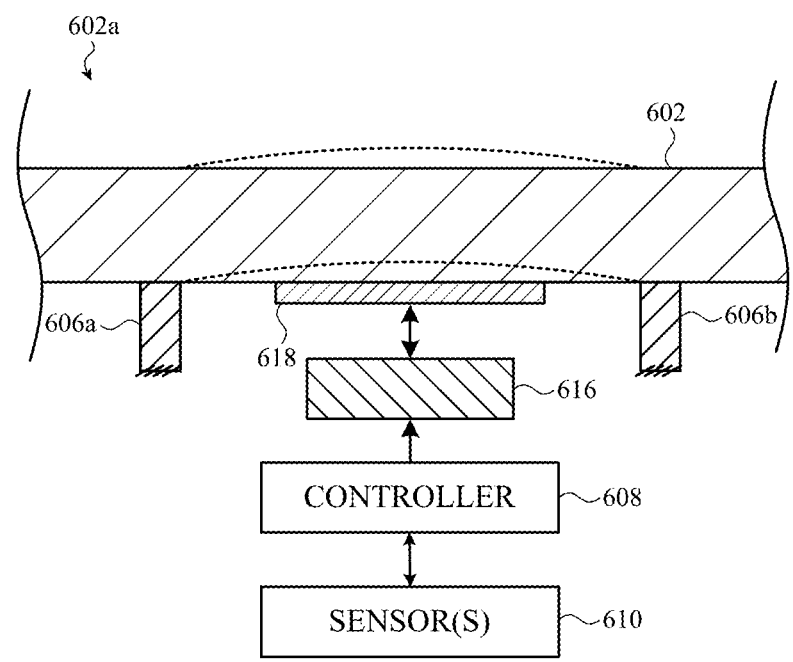
FIG. 6H depicts a simplified cross-section of yet another example haptic element that can be associated with the haptic output subsystem of FIG. 6A.

Other embodiments are configured in other ways. For example, as shown in FIG. 6F, more than one haptic element can be stacked or layered together. In particular, the haptic element 604 is backed by a differently-sized haptic element, labeled as the haptic element 612. In turn, the haptic element 612 is backed by a differently-sized haptic element, labeled as the haptic element 614. In this embodiment, the haptic output subsystem 600 can be configured to generate haptic output from one or all of the haptic elements 604, 612, and 614.

In still further examples, a haptic element can include multiple parts that attract or repel one another to generate a bending moment in the input surface 602. More particularly, FIG. 6G includes a haptic element implemented with an electromagnet 616 and an attractor plate 618, each coupled to the input surface and separated from one another by a distance. The attractor plate 618 can be a ferromagnetic material or, in other embodiments, can be a permanent magnet that can be attracted and/or repelled from by the electromagnet 616. In these embodiments, actuation of the electromagnet 616 causes a magnetic field to attract or repel the attractor plate 618, thereby inducing a bending moment in the input surface 602. In this example, the electromagnet 616 and the attractor plate 618 attract or repel along an axis generally parallel to the input surface 602, but this may not be required. For example, as shown in FIG. 6H, the attractor plate 618 and the electromagnet 616 may be configured to attract or repel along an axis generally perpendicular to the input surface 602.

The foregoing description of the embodiments depicted in FIGS. 5-6H, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of a haptic element of a haptic output subsystem of a notification system, such as described herein, are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, a notification system such as described herein can also provide one or more visual realignment cues to a user to encourage realignment of one or more of the user's fingers relative to a virtual input region. FIGS. 7A-7F depict example visual realignment cues that can be provided to a user in place of, or in conjunction with one or more of the haptic realignment cues described in reference to other embodiments described herein.

Figure 7A:
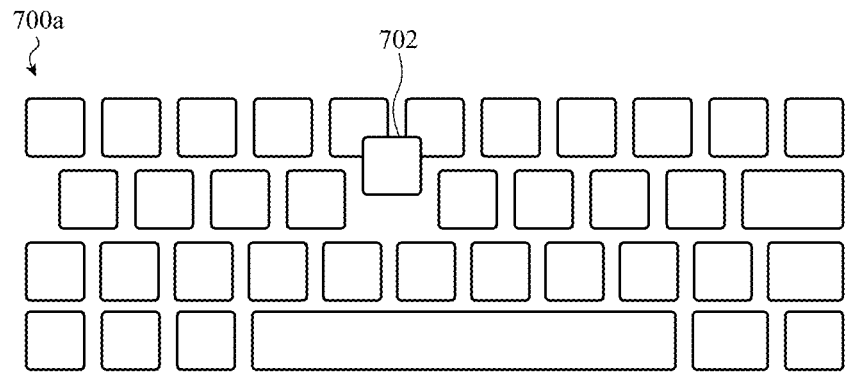
FIG. 7A depicts a virtual keyboard that may be presented by a graphical user interface, particularly showing an example visual realignment cue.
Figure 7B:
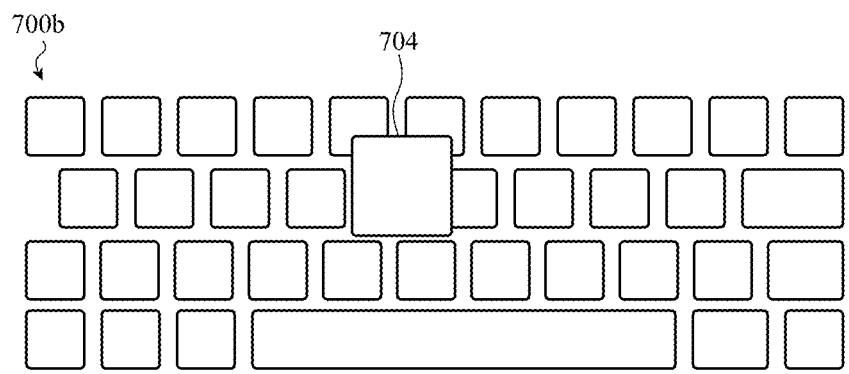
FIG. 7B depicts a virtual keyboard showing another example visual realignment cue.
Figure 7C:
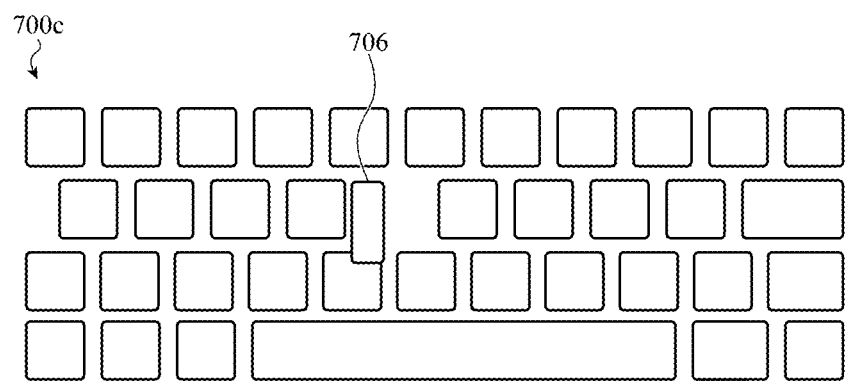
FIG. 7C depicts a virtual keyboard showing another example visual realignment cue.
Figure 7D:
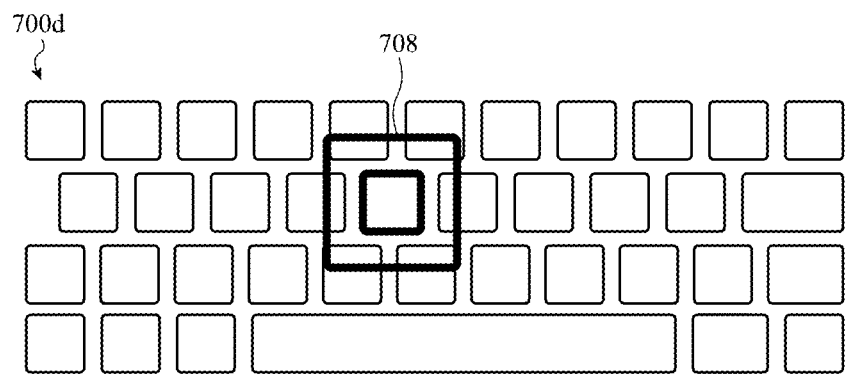
FIG. 7D depicts a virtual keyboard showing another example visual realignment cue.
Figure 7E:
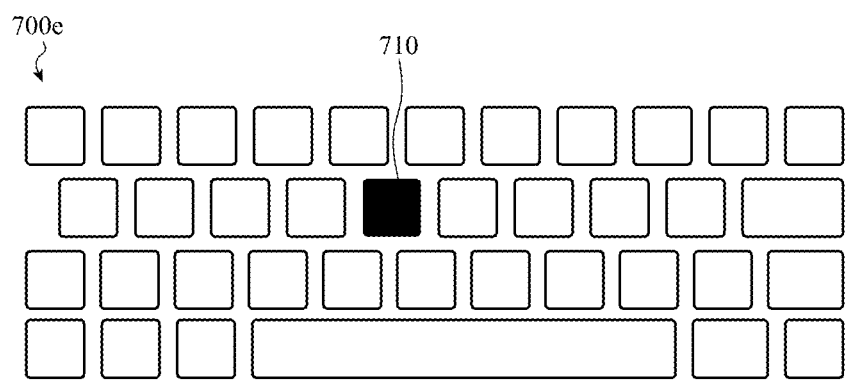
FIG. 7E depicts a virtual keyboard showing another example visual realignment cue.
Figure 7F:
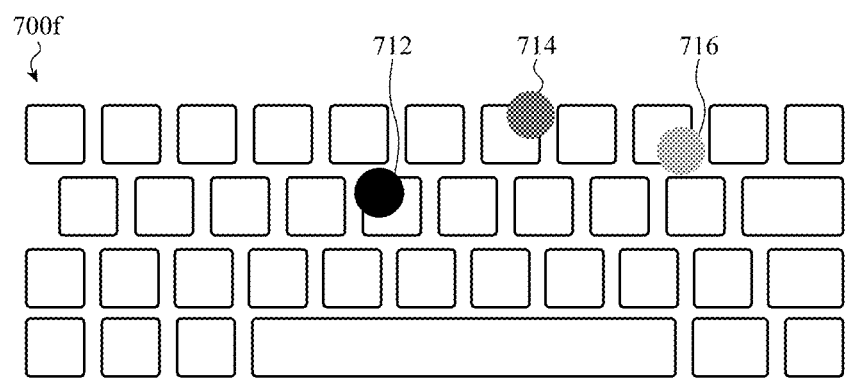
FIG. 7F depicts a virtual keyboard showing another example visual realignment cue.

For example, FIG. 7A depicts a virtual keyboard 700a (that may be presented by a graphical user interface) including multiple rows of virtual keys. In this example, a visual realignment cue 702 is provided by modifying a position of a virtual key that can be selected by a user. FIG. 7B depicts a virtual keyboard 700b which provides a visual realignment cue 704 in which a virtual key's size and positioning are modified. FIG. 7C depicts a virtual keyboard 700c which provides a visual realignment cue 706 in which a virtual key's shape and positioning are modified. FIG. 7D depicts a virtual keyboard 700d which provides a visual realignment animation 708 in which a virtual key's position is highlighted by a perimeter animation. FIG. 7E depicts a virtual keyboard 700e which provides a visual realignment cue 710 in which a virtual key's coloring or patterning are modified. FIG. 7F depicts a virtual keyboard 700f which provides visual realignment cues 712, 714, and 716 in which a user's past finger positions are highlighted with fading after-images. The example embodiments depicted in FIGS. 7A-7F are merely examples; it is appreciated that any number of visual effects can be provided in conjunction with or in place of audio cues and/or haptic cues described herein. Further, it is appreciated that any number of suitable visual cues apart from these specific examples provided above are possible including, but not limited to: virtual key animations; virtual key shape, size, color, design, font, position, or rotation changes; after image animations; and so on.

Figure 8:
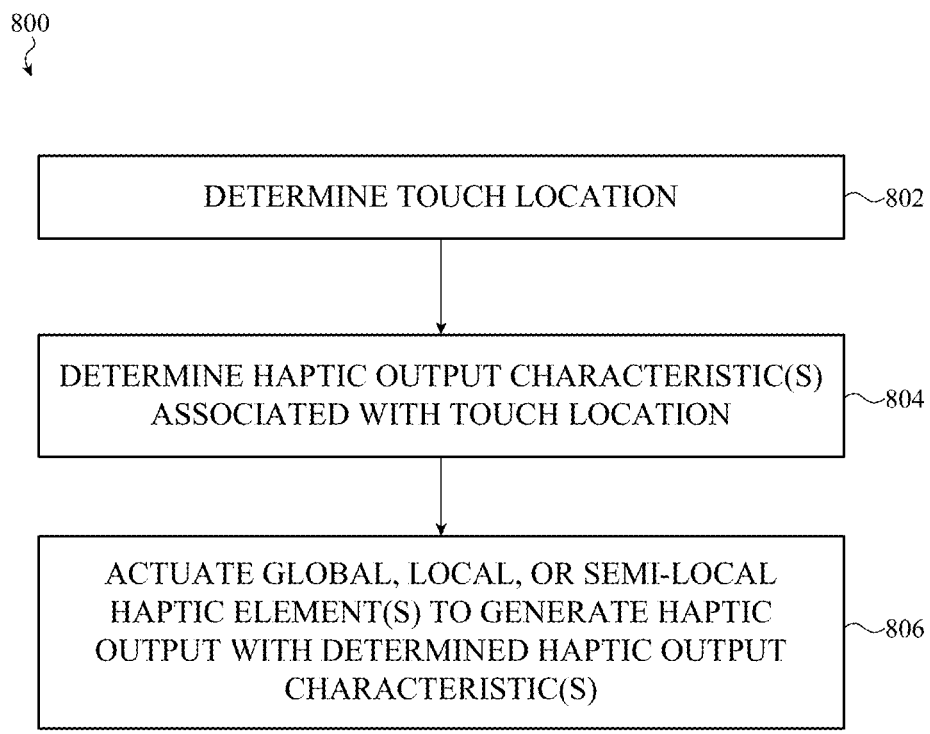
FIG. 8 is a flowchart depicting example operations of a method of providing realignment cues to a user of a touch-sensitive display.
Figure 9:
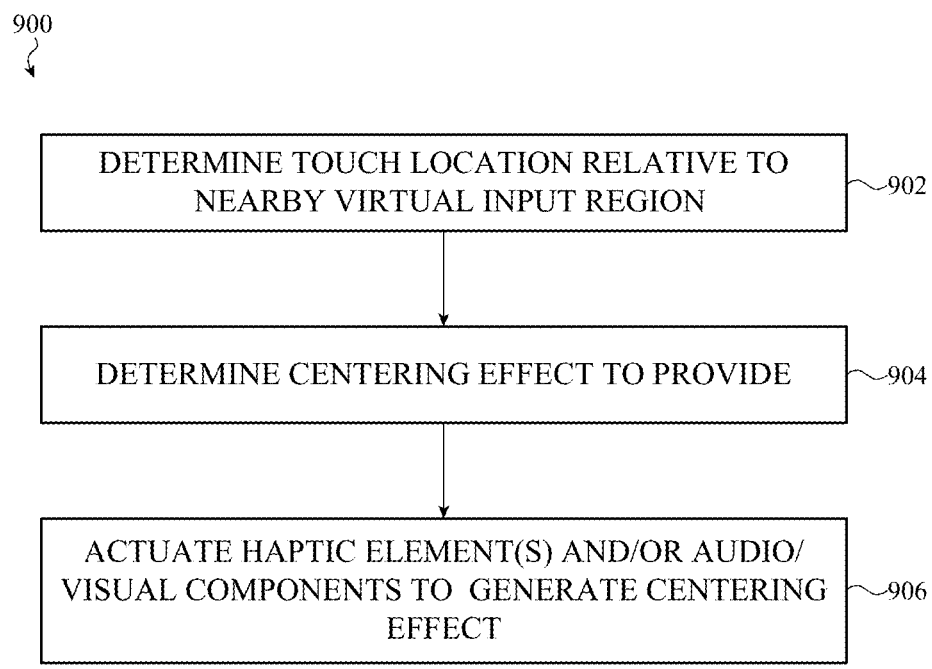
FIG. 9 is a flowchart depicting example operations of another method of providing realignment cues to a user of a touch-sensitive display.

FIGS. 8-9 are simplified flow chart diagrams corresponding to example operations of methods of providing realignment cues with a notification system, such as described herein.

FIG. 8 depicts operations of a method of providing haptic feedback to cue a user to readjust the user's finger positioning relative to a virtual input region of a graphical user interface. In particular, the method 800 includes operation 802 in which a touch location is provided by a user. At operation 804, one or more haptic output characteristics associated with the touch location can be obtained (e.g., determined, accessed from a memory, and so on). As noted with respect to other embodiments described herein, the haptic output characteristics can be based on a distance between the touch location and a central location of one or more virtual input regions of the graphical user interface. Once the haptic output characteristics are determined at operation 804, one or more haptic outputs can be provided at operation 806. These haptic outputs can be global haptic outputs, local haptic outputs, semi-local haptic outputs, or any other suitable haptic output.

FIG. 9 depicts operations of another method of providing haptic feedback to cue a user to readjust the user's finger positioning relative to a virtual input region of a graphical user interface. In particular, the method 900 includes operation 902 in which a distance between a touch location provided by a user and a central region of a virtual input region is determined. At operation 904, one or more output characteristics associated with the touch location can be obtained (e.g., determined, accessed from a memory, and so on). In this embodiment, the output characteristics correspond to a haptic output or haptic effect that provide a centering cue to the user to re-center the user's finger relative to the central region of the virtual input region. Once the haptic output characteristics are determined at operation 904, one or more haptic, acoustic, and/or visual outputs can be provided at operation 906.

The present disclosure recognizes that personal information data, including private inter-person communications, in the present technology, can be used to the benefit of users. For example, the use of haptic simulation on a surface of an electronic device can be used to provide for a more immersive computing experience.

The present disclosure further contemplates that the entities responsible for the collection, analysis, disclosure, transfer, storage, or other use of such personal information or communication data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including private inter-person communications. That is, the present disclosure contemplates that hardware and/or software elements can be provided to prevent or block access to such personal information data.

In addition, one may appreciate that although many embodiments are disclosed above, that the operations and steps presented with respect to methods and techniques described herein are meant as exemplary and accordingly are not exhaustive. One may further appreciate that alternate step order or, fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
 a touch-sensitive display defining an input surface configured to receive a touch input to a virtual key presented by the touch-sensitive display;
 a haptic element coupled to the input surface; and
 a controller in communication with the haptic element and the touch-sensitive display and configured to:
 detect a sequence of touch inputs occurring within a region of the virtual key, the sequence of touch inputs including a current touch and multiple previous touches, each of the multiple previous touches associated with an actuation of the virtual key caused by placement of a user's body part within the region of the virtual key;

determine a relative positional drift of the current touch relative to the multiple previous touches using the sequence of touch inputs; and in response to the relative positional drift exceeding a threshold, actuate the haptic element to produce a haptic output.

2. The electronic device of claim 1, wherein the haptic element comprises a piezoelectric material coupled to the touch-sensitive display.

3. The electronic device of claim 2, wherein the piezoelectric material is configured to induce a bending moment into the input surface such that, when actuated, the haptic element generates a localized haptic output through the input surface below the virtual key.

4. The electronic device of claim 1, wherein the haptic element is configured to vibrate the input surface at a frequency between 100 Hz and 200 Hz to produce the haptic output.

5. The electronic device of claim 1, wherein the haptic element is configured to vibrate the input surface at an ultrasonic frequency to produce the haptic output.

6. The electronic device of claim 1, wherein the haptic element is configured to laterally shift the input surface to produce the haptic output.

7. The electronic device of claim 1, wherein a frequency or an amplitude of the haptic output is based, at least in part, on a determined distance between one of the sequence of touch inputs and a central region of the virtual key.

8. The electronic device of claim 1, wherein the haptic output is localized to the current touch.

9. A method of operating a touch-sensitive display positioned below an input surface, the method comprising:

displaying a virtual keyboard on the touch-sensitive display;

receiving a series of individual touch inputs occurring within a region of a virtual key of the virtual keyboard, the series of individual touch inputs including a current touch input and multiple previous touch inputs, the multiple previous touch inputs each associated with an actuation of the virtual key caused by placement of a user's body part within the region of the virtual key;

determining a relative positional drift of the current touch input relative to the multiple previous touch inputs using the series of individual touch inputs; and in response to the relative positional drift exceeding a threshold, providing a haptic output at least partially localized to the region of the virtual key.

10. The method of claim 9, wherein the haptic output is localized to a boundary of the virtual key.

11. The method of claim 9, wherein the haptic output is localized to a touch input of the series of individual touch inputs.

12. The method of claim 9, wherein the haptic output comprises decreasing friction between the input surface and an object in contact with the input surface.

13. The method of claim 9, further comprising providing an acoustic output simultaneously with the haptic output.

14. The method of claim 9, further comprising providing a visual output on the touch-sensitive display simultaneously with the haptic output.

15. A method of operating a touch-sensitive display positioned below an input surface, the method comprising:

receiving a set of touch inputs occurring within a region of a virtual key of a virtual keyboard presented by the touch-sensitive display, the set of touch inputs including a current touch input and multiple previous touch inputs, the multiple previous touch inputs each associated with an actuation of the virtual key caused by placement of a user's body part within the region of the virtual key;

estimating a relative positional drift of the current touch input relative to the multiple previous touch inputs using the set of touch inputs; and in response to the relative positional drift exceeding a threshold, actuating a haptic element to produce:

a first haptic output, localized to the virtual key, upon determining that the current touch input is located in a central region of the virtual key; and a second haptic output, localized to a boundary of the virtual key, upon determining that the current touch input is located outside the central region of the virtual key.

16. The method of claim 15, wherein the first haptic output is different from the second haptic output.

17. The method of claim 16, wherein:

the first haptic output corresponds to a first vibration of the input surface at a first frequency; and the second haptic output corresponds to a second vibration of the input surface at a second frequency.

18. The method of claim 17, wherein the first frequency is related to a distance between the current touch input and the central region of the virtual key.

19. The method of claim 17, wherein an amplitude of the first vibration is related to a distance between the set of touch inputs and the central region of the virtual key.

20. The method of claim 15, further comprising:

providing a first acoustic output with the first haptic output; and providing a second acoustic output with the second haptic output.

* * * * *